United States Patent
Chen et al.

(10) Patent No.: US 8,401,074 B2
(45) Date of Patent: Mar. 19, 2013

(54) PICTURE CODING METHOD, PICTURE DECODING METHOD, PICTURE CODING APPARATUS, PICTURE DECODING APPARATUS, AND PROGRAM THEREOF

(75) Inventors: Tao Chen, Diamond Bar, CA (US); Jiuhuai Lu, Palos Verdes Peninsula, CA (US); Yoshiichiro Kashiwagi, Arcadia, CA (US); Shinya Kadono, Hyogo (JP); Chong Soon Lim, Singapore (SG)

(73) Assignee: Panasonic Corporation, Osaka (JP)

( * ) Notice: Subject to any disclaimer, the term of this patent is extended or adjusted under 35 U.S.C. 154(b) by 515 days.

(21) Appl. No.: 12/607,777

(22) Filed: Oct. 28, 2009

(65) Prior Publication Data

US 2010/0054330 A1   Mar. 4, 2010

Related U.S. Application Data

(62) Division of application No. 10/581,019, filed as application No. PCT/US2005/002457 on Jan. 26, 2005, now Pat. No. 7,630,435.

(Continued)

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.03
(58) Field of Classification Search .............. None
See application file for complete search history.

(56) References Cited

U.S. PATENT DOCUMENTS

| | | |
|---|---|---|
| 5,034,965 A | 7/1991 | Kato |
| 5,392,037 A | 2/1995 | Kato |
| 6,097,846 A | 8/2000 | Abe |
| 6,111,989 A | 8/2000 | Chang et al. |
| 6,445,739 B1 | 9/2002 | Shen et al. |
| 6,681,052 B2 | 1/2004 | Luna et al. |
| 6,934,677 B2 | 8/2005 | Chen et al. |
| 7,295,609 B2 | 11/2007 | Sato et al. |
| 7,733,955 B2 | 6/2010 | Sato et al. |
| 2003/0147463 A1 | 8/2003 | Sato et al. |
| 2004/0190610 A1 | 9/2004 | Song et al. |
| 2007/0286501 A1 | 12/2007 | Sato et al. |
| 2009/0010334 A1 | 1/2009 | Ueda et al. |

(Continued)

FOREIGN PATENT DOCUMENTS

| | | |
|---|---|---|
| JP | 02-216917 | 8/1990 |
| JP | 04-343576 | 11/1992 |

(Continued)

OTHER PUBLICATIONS

Draft ITU-T Recommendation H.264 (aka "H.26L"), ITU-Telecommunications Standardization Sector; Study Group 16, Question 6; Video Coding Experts Group (VCEG); 16th Meeting: Fairfax, VA USA, May 6-10, 2002, pp. 2-142.

(Continued)

*Primary Examiner* — Nhon Diep

(57) ABSTRACT

The picture decoding method according to the present invention is a decoding method for decoding coded pictures by inverse quantization and inverse orthogonal transformation, in which a quantization matrix which defines a scaling ratio of a quantization step for each component is multiplied by a multiplier, which is a coefficient for frequency transformation or a quantization step, and also, a result of the multiplication is multiplied by a quantized value, as a process of inverse quantization.

7 Claims, 31 Drawing Sheets

Related U.S. Application Data

(60) Provisional application No. 60/540,636, filed on Jan. 30, 2004, provisional application No. 60/551,690, filed on Mar. 9, 2004, provisional application No. 60/552,907, filed on Mar. 12, 2004, provisional application No. 60/561,351, filed on Apr. 12, 2004.

(56) References Cited

U.S. PATENT DOCUMENTS

| 2010/0061450 | A1 | 3/2010 | Sato et al. |
| 2010/0061644 | A1 | 3/2010 | Sato et al. |

FOREIGN PATENT DOCUMENTS

| JP | 05-235778 | 9/1993 |
| JP | 06-284412 | 10/1994 |
| JP | 10-276097 | 10/1998 |
| JP | 11-088880 | 3/1999 |
| JP | 2001-258029 | 9/2001 |
| JP | 2001-359107 | 12/2001 |
| JP | 2003-289542 | 10/2003 |
| WO | 03/017497 | 2/2003 |

OTHER PUBLICATIONS

Japanese Patent Application No. 2006-519700 Office Action dated Nov. 29, 2011, 3 pages.
Suzuki, Teruhiko et al. "New Quantization Tools", ITU Telecommunications Standardization Sector, Study Group 16 Questions 6, Video Coding Experts Group, Doc. No. VCEG-O52; 15$^{th}$ Meeting: Pattaya, Thailand, Dec. 4-6, 2011, 13 pages.
Japanese Application No. 2006-519700 Office Action dated Dec. 21, 2010, 4 pages.
Japanese Application No. 2006-551435 Office Action dated Oct. 12, 2010, 3 pages.
Japanese Application No. 2006-549708 Office Action dated Dec. 14, 2010, 3 pages.
Lu, Jiuhuai et al. "Proposal of Quantization Weighting for H.264/MPEG-4 AVC Professional Profiles"; Joint Video Team (JVT) of ISO/IEC MPEG & ITU-T VCEG, 11th Meeting: Munich, Germany, Mar. 19, 2004, pp. 1-10.
Suzuki, Teruhiko et al. "Quantization Tools for High Quality Video"; Joint Video Team (JVT) of ISO/IEC MPEG & ITU-T VCEG, 2$^{nd}$ Meeting: Geneva, Switzerland, Feb. 1, 2002, pp. 1-10.
Suzuki, Teruhiko et al. "New Quantization Tools", ISO/IEC JTC1/SC29/WG11/MPEG2001, No. M7737, Dec. 3, 2001, pp. 1-11.
Wiegand, Thomas "H.26L Test Model Long-Term. Number 9 (TML-9) Draft", ITU-T Telecommunication Standardization Sector of ITU, Geneva, Switzerland, Dec. 21, 2001, pp. 1-75.
Weigand, Thomas et al. "Draft ITU-T Recommendation and Final Draft International Standard of Joint Video Specification (ITU-T Rec. H.264, ISO/IEC 14496-10 AVC)"; 8$^{th}$ Meeting, Geneva, Switzerland, May 23-27, 2003, pp. 127-134 (plus cover).
Gordon, Steve et al. "Simplified Use of 8x8 Transforms—Proposal" 10th Meeting, Waikoloa, Hawaii, Dec. 8-12, 2003, pp. 1-12.
Sullivan, Gary et al. "Proposed Draft Errata List with Revision-Marked Corrections for H.264/AVC", 10$^{th}$ Meeting: Waikoloa, Hawaii, Dec. 8-11, 2003, pp. 138-142 (plus cover).
Japanese Patent Application No. 2011-010283 Office Action dated Dec. 18, 2012, 2 pages.

FIG. 2

Low frequency | Horizontal high frequency

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 24 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

Vertical high frequency d0=(D0+D1'+D2+D3'/2)/2
d1=(D0+D1'/2- D2- D3')2
d2=(D0+D1'/2- D2+D3')2
d3=(D0- D1'+D2- D3'/2)/2
 D1'=D1√8/√5
 D3'=D3√8/√5

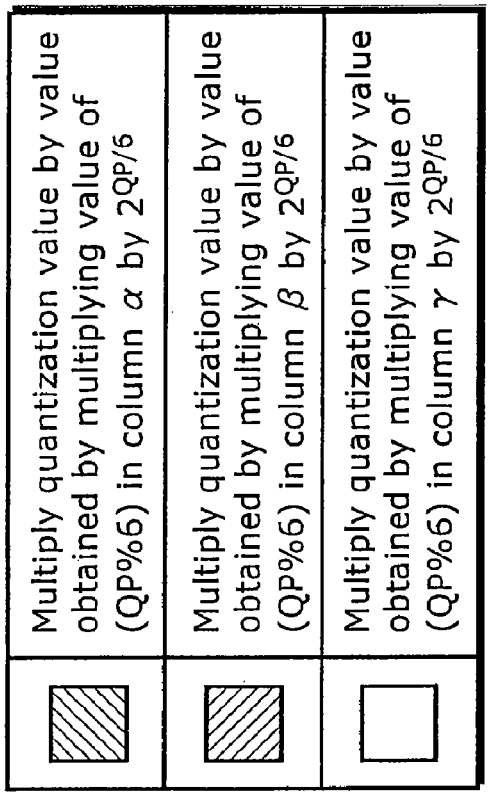
FIG. 15B
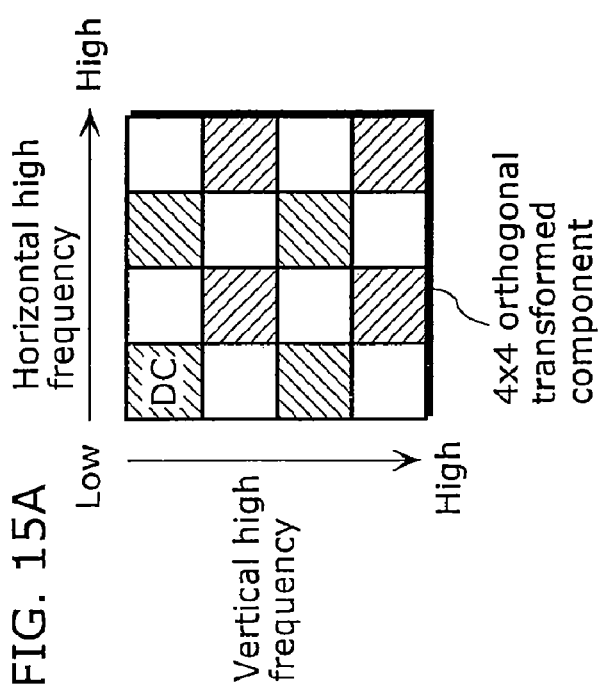
FIG. 15A
FIG. 15C

$$W = \begin{bmatrix} 2506 \\ 2211 \\ 1979 \\ 1709 \\ 1566 \\ 1392 \end{bmatrix} \quad V = \begin{bmatrix} 15 \\ 17 \\ 19 \\ 22 \\ 24 \\ 27 \end{bmatrix}$$

Fig.30

Quantization matrix Qq (corresponding to Q1a at the encoder):

De-quantization matrix Qd (corresponding to Q2b at both the encoder and decoder):

$$\begin{matrix} 16,19,26,29 \\ 19,26,29,34 \\ 22,27,32,40 \\ 26,29,38,56 \end{matrix}$$

Fig.33

$$W = \begin{bmatrix} 13107 & 5243 & 8066 \\ 11916 & 4660 & 7490 \\ 10082 & 4194 & 6554 \\ 9362 & 3647 & 5825 \\ 8192 & 3355 & 5243 \\ 7282 & 2893 & 4559 \end{bmatrix} \quad V = \begin{bmatrix} 10 & 16 & 13 \\ 11 & 18 & 14 \\ 13 & 20 & 16 \\ 14 & 23 & 18 \\ 16 & 25 & 20 \\ 18 & 29 & 23 \end{bmatrix}$$

Fig.34  Quantization matrix Qq
(corresponding to Q1a at the encoder):

$$\begin{matrix} 2580992, & 1412904, & 1588303, & 925696 \\ 1412904, & 660716, & 925696, & 505254 \\ 1877085, & 994266, & 1290496, & 671130 \\ 1032507, & 592366, & 706452, & 306761 \end{matrix}$$

Fig.35  De-quantization matrix Qd
(corresponding to Q2b at both the encoder and decoder):

$$\begin{matrix} 3328, & 4864, & 5408, & 7424 \\ 4864, & 8320, & 7424, & 10880 \\ 4576, & 6912, & 6656, & 10240 \\ 6656, & 9280, & 9728, & 17920 \end{matrix}$$

Fig.36

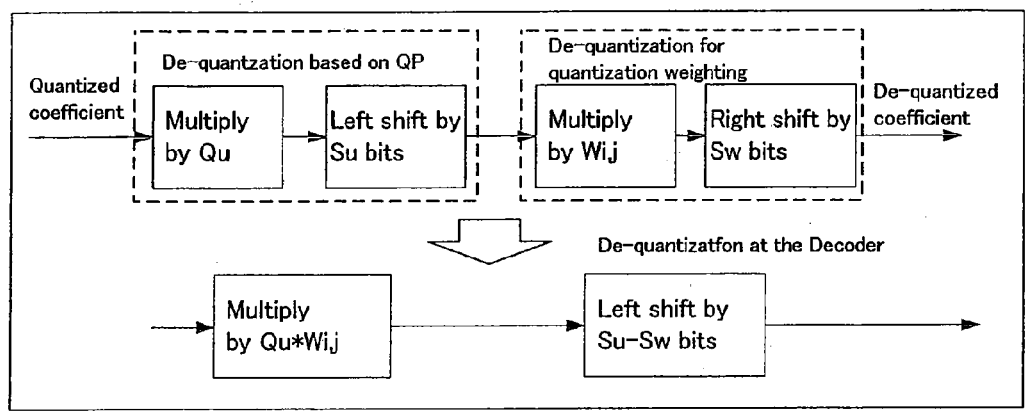

Fig.37

$$W = \begin{bmatrix} 16 & 16 & 19 & 22 & 26 & 27 & 29 & 34 \\ 16 & 16 & 22 & 24 & 27 & 29 & 34 & 37 \\ 19 & 22 & 26 & 27 & 29 & 34 & 34 & 39 \\ 22 & 22 & 26 & 28 & 30 & 35 & 37 & 41 \\ 22 & 26 & 27 & 28 & 33 & 40 & 42 & 49 \\ 26 & 27 & 30 & 32 & 35 & 40 & 48 & 59 \\ 26 & 27 & 31 & 34 & 38 & 46 & 57 & 69 \\ 26 & 29 & 36 & 39 & 45 & 55 & 68 & 78 \end{bmatrix}$$

Fig.38

$d_{ij} = (c_{ij} * M(QP\%6, i, j)) << QP/6 - 4,$ for $QP/6 >= 4.$ (1)

$d_{ij} = (c_{ij} * M(QP\%6, i, j)) + 1 << (3 - QP/6) >> 4 - QP/6,$ for $QP/6 < 4.$ (2)

where
$M(QP\%6, i, j) = W(i, j) * \text{LevelScale}(QP\%6, i, j)$ (3)

In 8x8case, we use the definition as defined in Ref.2.

$$\text{LevelScale}(m, i, j) = \begin{bmatrix} 15 \\ 17 \\ 19 \\ 22 \\ 24 \\ 27 \end{bmatrix}$$ (4)

$d_{ij}$ is used for inverse transform, where inverse transform is fully defined in Ref.2.

Fig.39

$$\text{LevelScale}(m,i,j) = \begin{cases} Vm0 & \text{for } (i,j) \in \{(0,0),(0,2),(2,0),(2,2)\}, \\ Vm1 & \text{for } (i,j) \in \{(1,1),(1,3),(3,1),(3,3)\}, \\ Vm3 & \text{otherwise;} \end{cases}$$

Fig.40

$$V = \begin{bmatrix} 10 & 16 & 13 \\ 11 & 18 & 14 \\ 13 & 20 & 16 \\ 14 & 23 & 18 \\ 16 & 25 & 20 \\ 18 & 29 & 23 \end{bmatrix}$$

Fig.41

$$\begin{bmatrix} 8 & 14 & 20 & 24 & 50 & 50 & 50 & 50 \\ 14 & 15 & 23 & 26 & 50 & 50 & 50 & 50 \\ 19 & 22 & 27 & 31 & 50 & 50 & 50 & 50 \\ 23 & 23 & 28 & 30 & 50 & 50 & 50 & 50 \\ 24 & 28 & 32 & 50 & 50 & 50 & 50 & 50 \\ 34 & 35 & 50 & 50 & 50 & 50 & 50 & 50 \\ 40 & 50 & 50 & 50 & 50 & 50 & 50 & 50 \\ 50 & 50 & 50 & 50 & 50 & 50 & 50 & 50 \end{bmatrix}$$

Fig.42

$$\begin{bmatrix} 2560 & 4256 & 8000 & 7296 & 16000 & 15200 & 20000 & 15200 \\ 4256 & 4320 & 8832 & 7488 & 15200 & 14400 & 19200 & 14400 \\ 7600 & 8448 & 13824 & 11904 & 20000 & 19200 & 25600 & 19200 \\ 6992 & 6624 & 10752 & 8640 & 15200 & 14400 & 19200 & 14400 \\ 7680 & 8512 & 12800 & 15200 & 16000 & 15200 & 20000 & 15200 \\ 10336 & 10080 & 19200 & 14400 & 15200 & 14400 & 19200 & 14400 \\ 16000 & 19200 & 25600 & 19200 & 20000 & 19200 & 25600 & 19200 \\ 2560 & 4256 & 8000 & 7296 & 16000 & 15200 & 20000 & 15200 \end{bmatrix}$$

Fig.43

$$f = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} c00 & c01 & c02 & c03 \\ c10 & c11 & c12 & c13 \\ c20 & c21 & c22 & c23 \\ c20 & c31 & c32 & c33 \end{bmatrix} \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

PICTURE CODING METHOD, PICTURE DECODING METHOD, PICTURE CODING APPARATUS, PICTURE DECODING APPARATUS, AND PROGRAM THEREOF

CROSS REFERENCE TO RELATED APPLICATION(S)

The present application is a divisional application of U.S. patent application Ser. No. 10/581,019 filed on May 30, 2006, now U.S. Pat. No. 7,630,435, which is a 371 of PCT/US2005/002457 Jan. 26, 2005 which claims benefit of 60/540,636 Jan. 30, 2004 and claims benefit of 60/551,690 Mar. 9, 2004 and claims benefit of 60/552,907 Mar. 12, 2004 and claims benefit of 60/561,351 Apr. 12, 2004, the contents of which are herein incorporated by reference in its entirety.

TECHNICAL FIELD

The present invention relates to a picture coding method for efficiently compressing moving pictures and a picture decoding method for correctly decoding such compressed moving pictures, as well as to a picture coding apparatus, a picture decoding apparatus, and a program thereof.

BACKGROUND ART

Recently, with an arrival of the age of multimedia which handles integrally audio, video and pixel values, existing information media, i.e., newspaper, journal, TV, radio and telephone and other means through which information is conveyed to people, has come under the scope of multimedia. In general, multimedia refers to a representation in which not only characters but also graphic symbols, audio, and especially, pictures and the like, are related to each other. However, in order to include the aforementioned existing information media in the scope of multimedia, it appears as a prerequisite to represent such information in digital form.

However, when estimating the amount of information contained in each of the aforementioned information media in a digital form, the information amount per character requires 1-2 bytes whereas audio requires more than 64 Kbits per second (telephone quality), and when it comes to a moving picture, it requires more than 100 Mbits per second (present television reception quality). Therefore, it is not realistic for the information media mentioned above to handle, in digital form, such an enormous amount of information as it is. For example, a videophone has already been put into practical use via Integrated Services Digital Network (ISDN) with a transmission rate of 64 Kbits/s to 1.5 Mbits/s, however, it is impossible to transmit pictures captured on the TV screen or shot by a TV camera directly through the ISDN.

This therefore requires information compression techniques, and for instance, in the case of a videophone, video compression techniques compliant with H.261 and H.263 standards internationally standardized by International Telecommunication Union-Telecommunication Standardization Sector (ITU-T) are employed. According to the information compression techniques compliant with MPEG-1 standard, picture information as well as audio information can be stored in an ordinary music Compact Disc (CD).

Here, the Moving Picture Experts Group (MPEG) is an international standard for a compression of moving picture signals and the MPEG-1 is a standard that compresses video signals down to 1.5 Mbits/s, namely, to compress the information included in TV signals approximately down to a hundredth. The quality targeted in the MPEG-1 standard was a medium one so as to realize a transmission rate primarily of about 1.5 Mbits/s, therefore, MPEG-2, standardized with the view to meet the requirements of even higher quality picture, realizes TV broadcast quality for transmitting a moving picture signal at a transmission rate of 2 to 15 Mbits/s.

In the present circumstances, a working group (ISO/IEC JTC1/SC29/WG11) previously in charge of the standardization of the MPEG-1/MPEG-2 has further standardized MPEG-4 which achieves a compression rate superior to the one achieved by the MPEG-1/MPEG-2, allows coding/decoding operations on a per-object basis and realizes a new function required by the age of multi media. At first, in the process of the standardization of the MPEG-4, the aim was to standardize a low bit rate coding, however, the aim is presently extended to a more versatile coding including a high bit rate coding for interlaced pictures and others. Moreover, a standardization of MPEG-4 AVC and ITU H.264, as a next generation coding method, is in process with a higher compression rate, jointly worked by the ITU-T and the ISO/IEC. The next generation coding method is published under the name of Committee Draft (CD) as of August 2002.

In coding of a moving picture, compression of information volume is usually performed by eliminating redundancy both in spatial and temporal directions. Therefore, inter-picture prediction coding, which aims at reducing the temporal redundancy, estimates a motion and generates a predictive picture on a block-by-block basis with reference to forward and backward picture(s), and then codes a differential value between the obtained predictive picture and a current picture to be coded. Here, "picture" is a term that signifies a picture on a screen, and represents a frame when used for a progressive picture whereas it represents a frame or a field when used for an interlaced picture. The interlaced picture here is a picture in which a single frame consists of two fields, each having a different capture time. For coding and decoding an interlaced picture, three ways of processing a single frame are possible: as a frame; as two fields; and as a frame/field structure depending on a block in the frame.

A picture to which intra-picture prediction coding is performed without reference pictures is called "I-picture". A picture to which inter-picture prediction coding is performed with reference to a single picture is called "P-picture". A picture to which inter-picture prediction coding is performed by simultaneously referring to two pictures is called "B-picture". A B-picture can refer to two pictures, arbitrarily selected from forward or backward pictures in display order. The reference images (i.e. reference pictures) can be specified for each block serving as a basic coding/decoding unit. Distinction shall be made between such reference pictures by calling a reference picture to be described earlier in a coded bitstream as a first reference picture, and by calling a reference picture to be described later in the bitstream as a second reference picture. Note that pictures used for reference need to be already coded and decoded, as a condition for coding and decoding these types of pictures.

A motion compensated inter-picture prediction coding is employed for coding P-pictures or B-pictures. Coding by use of motion compensated inter picture prediction is a coding method that employs motion compensation in inter picture prediction coding. Unlike a method for performing prediction simply based on pixel values in a reference picture, motion compensation is a technique capable of improving prediction accuracy as well as reducing the amount of data by estimating the amount of motion (hereinafter referred to as "motion vector") of each part within a picture and further by performing prediction in consideration of such amount of motion. For example, it is possible to reduce the amount of data through motion compensation by estimating motion vectors of the current picture to be coded and then by coding prediction residuals between prediction values obtained by shifting only the amount of the respective motion vectors and the current picture to be coded. In this technique, motion vectors are also recorded or transmitted in coded form, since motion vector information is required at the time of decoding.

Motion vectors are estimated on a per-macroblock basis. More specifically, a macroblock shall be previously fixed in the current picture to be coded, so as to estimate motion vectors by finding the position of the most similar reference block of such fixed macroblock within the search area in a reference picture.

FIG. 1 is a diagram illustrating an example data structure of a bitstream. As FIG. 1 shows, the bitstream has a hierarchical structure as follows. The bitstream (Stream) is made up of more than one group of pictures (GOP). By using GOPs as basic coding units, it becomes possible to edit a moving picture as well as to make a random access. Each GOP is made up of plural pictures, each being I picture, P picture, or B picture. Each picture is further made up of plural slices. Each slice, which is a strip-shaped area within each picture, is made up of plural macroblocks. Moreover, each stream, GOP, picture, and slice includes a synchronization signal (sync) for indicating an end point of each unit and a header (header) which is a piece of data common to such unit.

The header and data that is a part excluding the header may be transferred separately in the case of transmitting data not in a bitstream being a sequence of streams, but in a packet that is a unit of piecemeal data. In such case, the header and the data portion shall not be incorporated into the same bitstream, as shown in FIG. 1. In the case of packet, however, although a header and the corresponding data portion may not be transmitted sequentially, they are transferred simply in a different packet. Therefore, even in the case where the header and the data portion are not incorporated into the same bitstream, the same concept of bitstream as described with reference to FIG. 1 can be applied.

Generally speaking, the human visual system is characterized by its sensitivity to the low frequency components in a picture compared to the high frequency components. Furthermore, since the energy of the low frequency components in a picture signal is greater than that of the high frequency components, picture coding is performed in order from the low frequency components to the high frequency components. As a result, the number of bits required for coding the low frequency components is larger than that required for the high frequency components.

In view of the above points, the existing coding methods use larger quantization steps for the high frequency components than for the low frequency components when quantizing transformation coefficients, which are obtained by orthogonal transformation, of the respective frequencies. This technique has made it possible for the conventional coding method to achieve a large increase in compression ratio with negligible degradation in subjective quality in pictures.

Since the size of quantization steps of the high frequency components compared to that of the low frequency components depend on picture signal, a technique for changing the sizes of quantization steps for the respective frequency components on a picture-by-picture basis has been conventionally employed. A quantization matrix (also referred to as "weighting matrix") is used to derive quantization steps of the respective frequency components. FIG. 2 shows an example of the quantization matrix. In this drawing, the upper left component is a direct current component, whereas rightward components are horizontal high frequency components and downward components are vertical high frequency components. The quantization matrix in FIG. 2 also indicates that the quantization steps get larger as the values become greater. Usually, it is possible to use different quantization matrices for each picture. The value indicating the size of a quantization step of each frequency component is fixed-length-coded. Note that it is usual that each component of a quantization matrix and the value of each quantization step are approximately proportional to each other, but it is not necessary to stick to such relationship as long as the correspondence between them is clearly defined.

FIG. 3 is a flowchart showing inverse quantization performed by the conventional picture coding apparatus or picture decoding apparatus as presented in the MPEG-2 and the MPEG-4.

As shown in the diagram, the conventional picture coding apparatus or picture decoding apparatus obtains a weighting matrix $W_{i,j}$ and a quantization parameter QP (S11 and S12), calculates a quantization step QStep, and obtains a quantized value (i.e., a quantized frequency coefficient) $f_{i,j}$ (S14). Then, the picture coding apparatus derives an inverse quantized value by calculating $f_{i,j} \times QStep \times W_{i,j}$ (S15-S17).

In the processing of quantization performed by the picture coding apparatus, the frequency coefficients obtained as a result of orthogonal transformation is multiplied by an inverse number of the value resulted from the calculation of $QStep \times W_{i,j}$.

However, it is problematic that the conventional processing of quantization and inverse quantization imposes a lot of loads for calculations since a number of divisions and multiplications are required to be executed in the processing.

DISCLOSURE OF INVENTION

An object of the present invention is to provide a picture decoding method, a picture coding method, a picture decoding apparatus, a picture coding apparatus and a program, for reducing the amount of loads required for the calculations in quantization and inverse quantization.

In order to achieve the above object, the picture coding method of the present invention is a picture decoding method for decoding coded pictures by inverse quantization and inverse orthogonal transformation performed on a block-by-block basis. The method includes, as a process of inverse quantization: multiplying a quantization matrix and a multiplier, the quantization matrix indicating a scaling ratio of a quantization step for each frequency component, and the multiplier being a coefficient for orthogonal transformation or a quantization step; and multiplying a product resulted from the multiplication and a quantized value.

The multiplier may relate to a normalization factor used in a process of inverse orthogonal transformation.

According to the above structure, the amount of load required for calculation can be reduced since there is no need to execute multiplications required for frequency coefficients in the processing of inverse orthogonal transformation. That is to say, it is possible to reduce the multiplications required for inverse orthogonal transformation in order not to increase the amount of loads for the calculation in the quantization, by pre-computing the multiplications required for deriving quantization steps.

The multiplication between the quantization matrix and the multiplier may be executed for each coded data of a predetermined unit, and a multiplication between the product and the quantized value may be executed on a block-by-block basis, the coded data of a predetermined unit including coded blocks, and the product being common to the coded blocks.

The product resulted from the multiplication between the quantization matrix and the multiplier may be stored in a memory, and the multiplication between the product and the quantization value may involve reference to the memory.

The coded data of a predetermined unit may be data that corresponds to a picture.

According to the above structure, it is possible to reduce the number of operations so as to further reduce the amount of load for calculations, by dividing the processing into two: multiplications on a per-picture basis; and multiplications on a per-block basis.

A picture coding method, a picture decoding apparatus, and a picture coding apparatus, a program and the semiconductor apparatus according to the present invention have the same structure and obtain the same effects as described above.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 2 shows an example of a quantization matrix;

FIG. 11A shows arrays of weighting components in a quantization matrix, wherein each weighting component is defined for the orthogonal transform;

FIGS. 11B and 11C respectively show how each data obtained by coding each component in a quantization matrix is placed in a header;

FIGS. 15A to 15C are diagrams for explaining the processing of normalization and inverse quantization;

FIGS. 28-31 shows an example of deriving a quantization matrix based on an 8×8 weighting matrix according to a second embodiment;

FIGS. 32-35 shows an example of deriving a quantization matrix based on a 4×4 weighting matrix;

FIG. 36 is a block diagram showing the inverse quantization unit according to a third embodiment;

FIG. 37 shows an example of the weighting matrix;

FIG. 38 is a diagram showing the process of inverse quantization;

FIGS. 39 and 40 are diagrams showing the process of inverse quantization;

FIGS. 41 and 42 respectively shows an example of a table; and

FIG. 43 is a diagram showing inverse quantization performed on a 4×4 chroma DC block.

BEST MODE FOR CARRYING OUT THE INVENTION

First Embodiment

Figure 4:
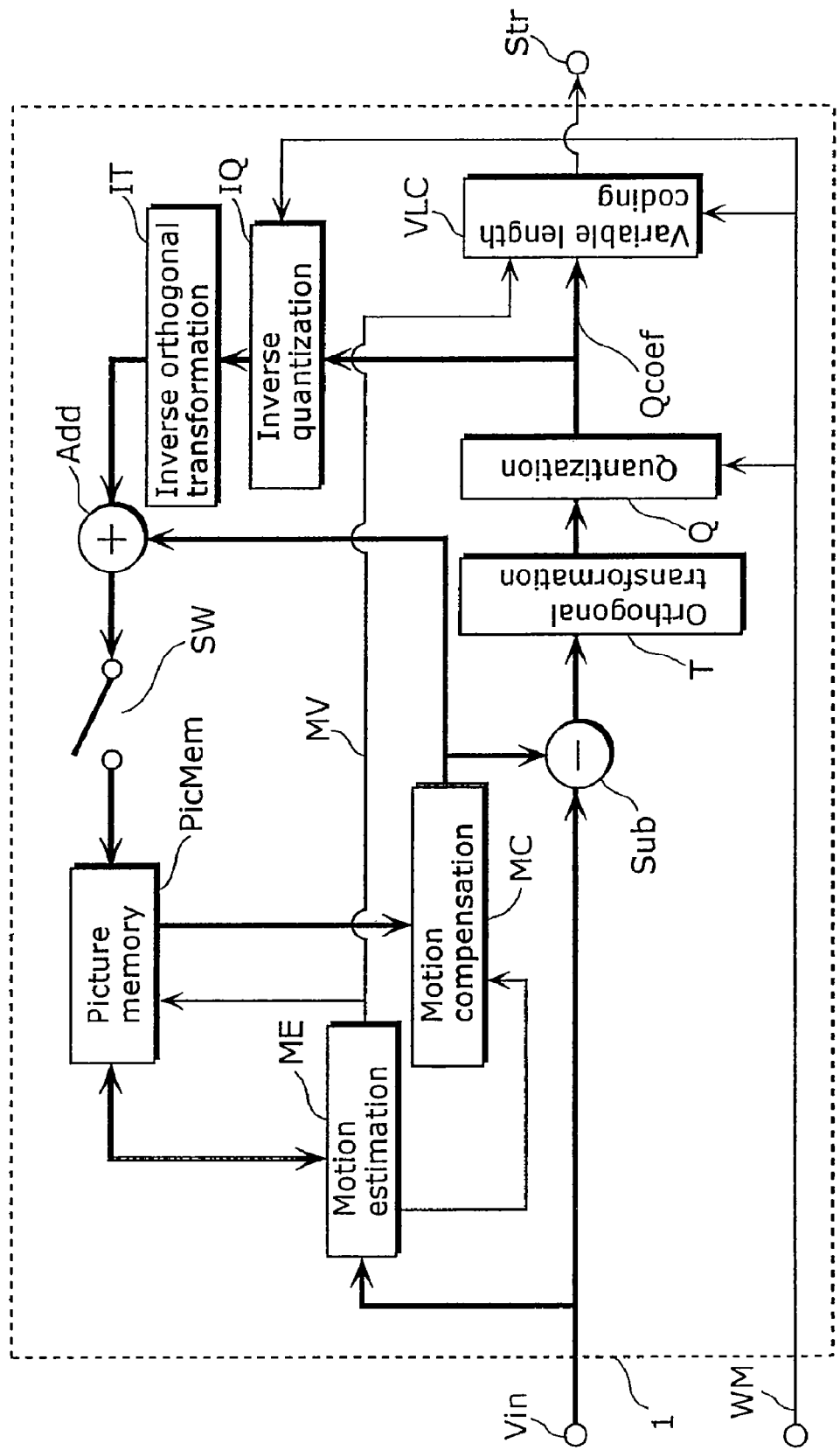
FIG. 4 is a block diagram showing the structure of a picture coding apparatus according to a first embodiment of the present invention.

FIG. 4 is a block diagram showing the structure of a picture coding apparatus according to the first embodiment of the present invention.

A picture coding apparatus 1 is an apparatus that outputs a coded picture signal Str which is obtained by performing compression coding on an inputted picture signal Vin and then converting the coded picture signal to a bitstream, e.g., variable length codes. Such picture coding apparatus 1 is comprised of a motion estimation unit ME, a motion compensation unit MC, a subtractor Sub, an orthogonal transformation unit T, a quantization unit Q, an inverse quantization unit IQ, an inverse orthogonal transformation unit IT, an adder Add, a picture memory PicMem, a switch SW, and a variable length coding unit VLC.

The picture signal Vin is inputted to the subtractor Sub and the motion estimation unit ME. The subtractor Sub calculates a residual image between each image in the inputted picture signal Vin and each predictive image, and outputs the calculated residual image to the orthogonal transformation unit T.

The orthogonal transformation unit T performs orthogonal transformation on the residual image to transform it into orthogonal transform coefficients or frequency coefficients, and outputs them to the quantization unit Q.

The quantization unit Q quantizes the frequency coefficients of each block that are inputted from the orthogonal transformation unit T, using quantization steps which are derived by referring to a quantization matrix WM inputted from outside, and outputs the resultant quantized values Qcoef to the variable length coding unit VLC.

The inverse quantization unit IQ performs inverse quantization on the quantized values Qcoef using the quantization steps that are derived with reference to the quantization matrix WM, so as to transform them into the frequency coefficients, and outputs them to the inverse orthogonal transformation unit IT. The inverse quantization unit IQ according to the present embodiment performs inverse quantization in two steps: the first step is to multiply, by a multiplier that is a coefficient for orthogonal transformation or a quantization step, the quantization matrix that indicates a scaling ratio of each quantization step for each frequency component, and store the result of the multiplication into a memory; and the second step is to multiply the result stored in the memory by each quantized value. The first step is operated on a per-picture basis while the second step is operated on a per-block basis. The multiplier for frequency transformation includes a normalization factor for inverse orthogonal transformation. In this case, the result of multiplication stored in the memory is a value obtained by multiplying each quantization step and the normalization factor for inverse orthogonal transformation.

The inverse orthogonal transformation IT performs inverse frequency transformation on the frequency coefficients so as to transform them into a residual image, and outputs it to the adder Add. The adder Add adds each residual image and each predictive image outputted from the motion compensation unit MC so as to obtain a decoded image. The switch SW is turned on in the case where it is indicated that such decoded image should be stored, and the decoded image is thus stored in the picture memory PicMem.

The motion estimation ME, to which the picture signal Vin is inputted on a per-macroblock basis, detects an image area that resembles the inputted picture signal Vin the most within the decoded picture stored in the picture memory PicMem, and determines motion vectors MV indicating a position of such image area. The estimation of motion vectors is performed for each block which is obtained by further dividing a macrobolock.

The motion compensation unit MC takes out, as a predictive image, the most suitable image area from a decoded picture stored in the picture memory PicMem, using the motion vectors detected in the above processing.

The variable length coding unit VLC performs variable length coding on each of the quantization matrices WM, the quantization values Qcoef, and the motion vectors MV so as to obtain a bitstream Str.

Figure 5:
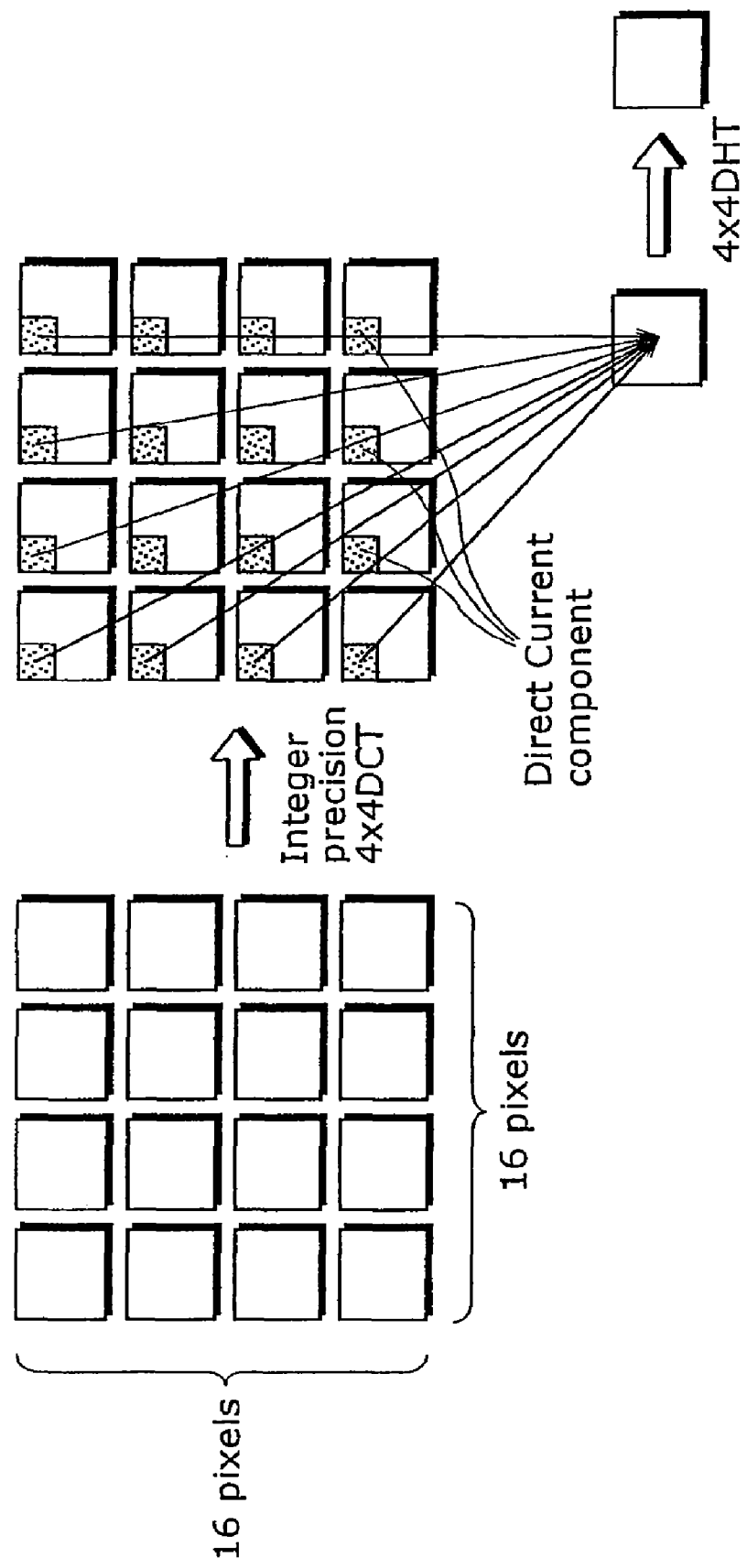
FIG. 5 shows a block structure and the orthogonal transformation to be performed on the blocks, in the case where 16×16 intra-picture prediction coding is performed on a luminance block of a macroblock.
Figure 6:
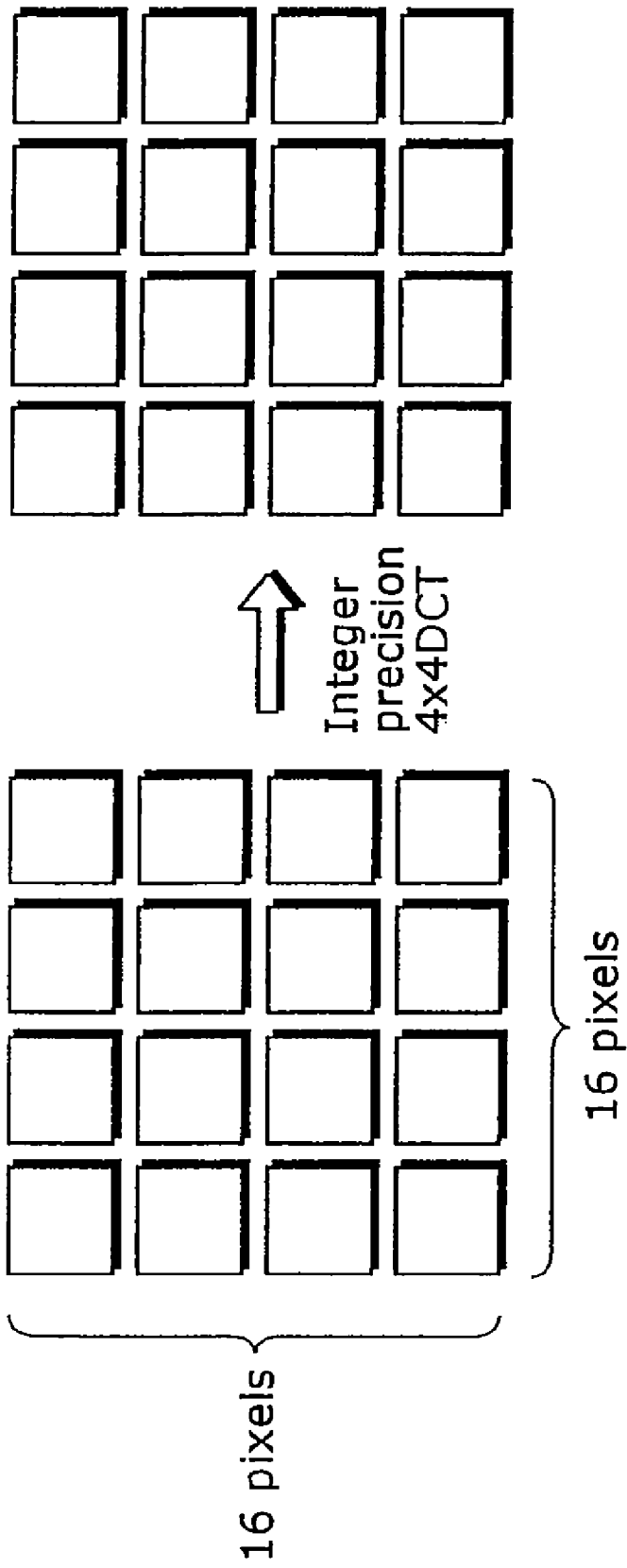
FIG. 6 shows a block structure and the orthogonal transformation to be performed on the blocks, in the case where 4×4 intra-picture prediction coding or 4×4 inter-picture prediction coding is performed on a luminance block of a macroblock.

FIGS. 5 and 6 respectively show the orthogonal transformation performed by the orthogonal transformation unit T according to the MPEG-4 AVC. For a luminance macroblock composed of 16×16 pixels, orthogonal transformation and block division with the use of the orthogonal transformation are differently performed for the case of intra-picture prediction coding on a 16×16 macroblock basis and for the case of other types of coding.

FIG. 5 shows a structure of a macroblock luminance block and the orthogonal transformation, in the case of 16×16 intra-picture prediction coding to be performed on the luminance block. The orthogonal transformation T in this case performs orthogonal transformation as in the following (1) to (4). (1) The luminance of 16×16 pixels is divided into 16 blocks of 4×4 pixels. (2) Orthogonal transformation based on integer precision 4×4 DCT is performed on each of the 4×4 blocks resulted from the division. Here, the integer precision DCT does not hold the same properties as the DCT since the values are rounded off, but still it can be utilized as a transformation that is approximate to the DCT. (3) A 4×4 DC block composed of Direct Current (DC) component in each of the orthogonal transformed blocks. (4) Hadamard transform is performed on the 4×4 DC block. The Hadamard transform, properly named as "Discrete Hadamard Transform (DHT)", is a simple orthogonal transformation that carries out only additions and subtractions.

FIG. 6 shows a structure of a luminance block and the orthogonal transformation to be performed on the luminance block, in the case of coding other than 16×16 intra-picture prediction coding such as 4×4 intra-picture prediction coding and 4×4 inter-picture prediction coding. The orthogonal transformation unit T in this case performs orthogonal transformation as in the following (1) and (2). (1) A luminance macroblock of 16×16 pixels is divided into 16 blocks of 4×4 pixels. (2) Orthogonal transformation based on integer precision DCT is performed on each of the 4×4 blocks resulted from the division.

Figure 7:
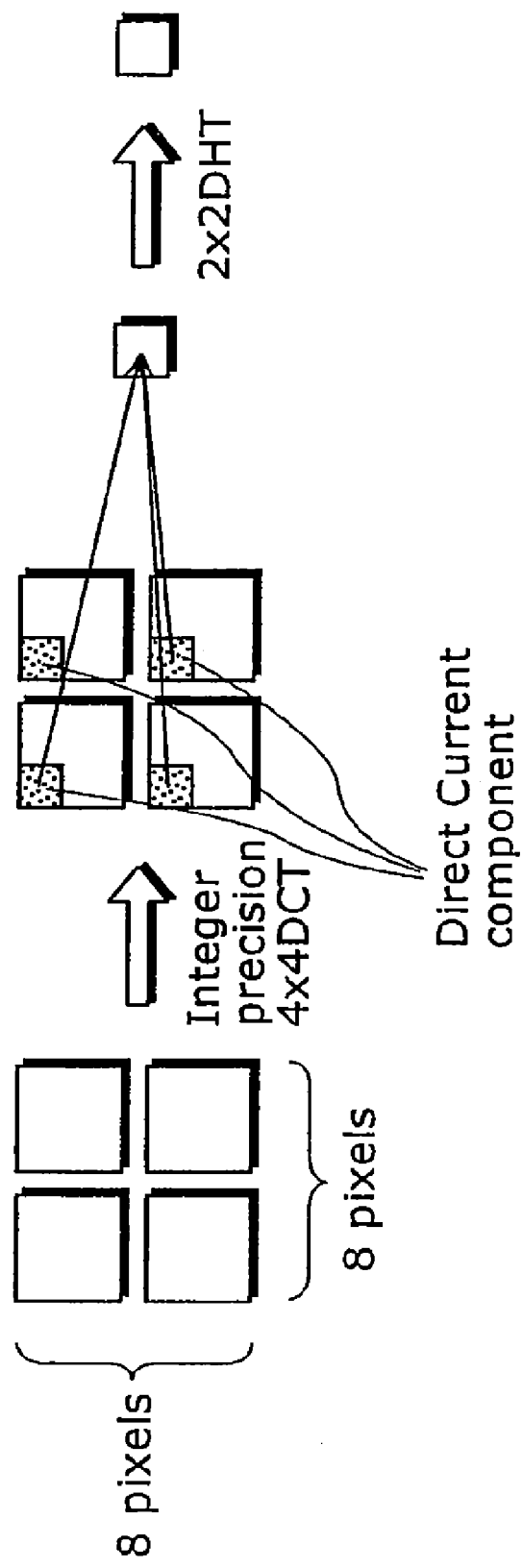
FIG. 7 shows a structure of a chrominance block of a macroblock and the orthogonal transformation to be performed on the block.

FIG. 7 shows a structure of a macroblock chrominance block and the orthogonal transformation to be performed on the chrominance block. The orthogonal transformation unit T in this case performs orthogonal transformation as in the following (1) to (4). (1) A chrominance macroblock composed of 8×8 pixels is divided into 4 blocks of 4×4 pixels. (2) Orthogonal transformation based on integer precision 4×4 DCT is performed on each of the 4×4 blocks resulted from the division. (3) A DC block of 2×2 pixels composed of the DC components in each orthogonal transformed block is generated. (4) The Hadamard transform is performed on each 2×2 DC block.

Thus, the orthogonal transformation unit T shall use Hadamard transform that is one of the most simple orthogonal transformations which can be realized only by executing additions and subtractions, for the DC blocks.

Figure 8:
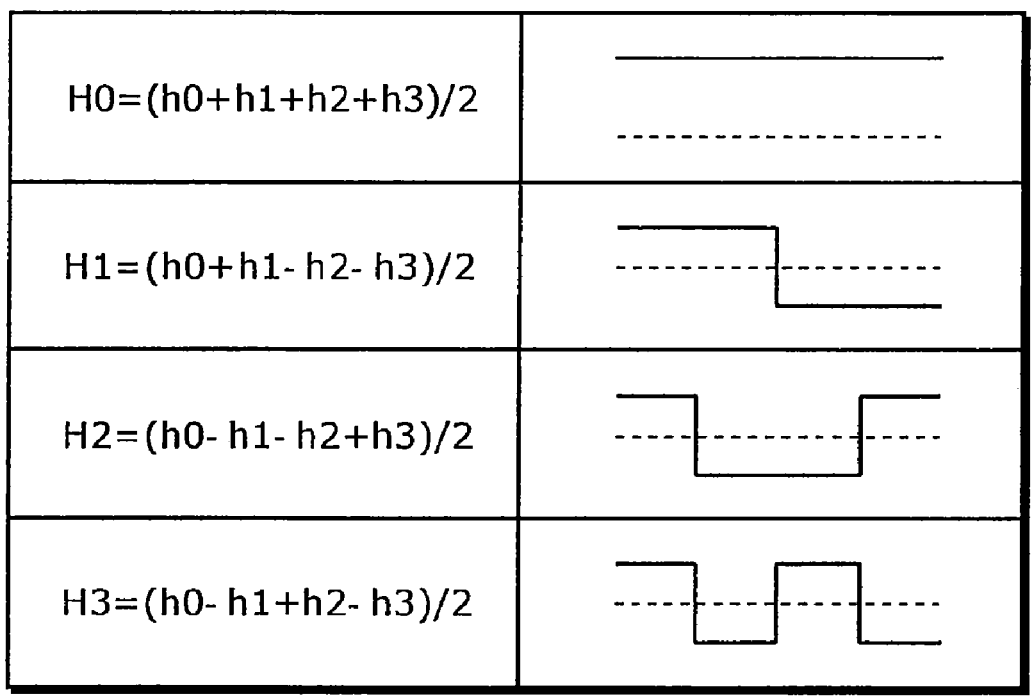
FIG. 8 shows equations used in Hadamard transform.

FIG. 8 shows equations used in the Hadamard transform and the wave formed images, each representing the respective equation. In the diagram, "h0"-"h3" present four input signals while "H0"-"H3" respectively present a component on which the Hadamard transform is performed. "H0" is a DC component on which the Hadamard transform is performed while "H3" is the highest frequency component on which the Hadamard transform is performed. An inverse transform of Hadamard transform is Hadamard transform. That is to say that "h0"-"h3" can be obtained by performing again Hadamard transform on "H0"-"H3".

Note that the Hadamard transform performed on a 2×2 DC luminance block can be obtained using the following equations. Namely, the following equations are used once for each row and each column in the 2×2 DC block.

$$H0=(h0+h1)/\sqrt{2}$$

$$H1=(h0-h1)/\sqrt{2}$$

Figures 9A, 9B:
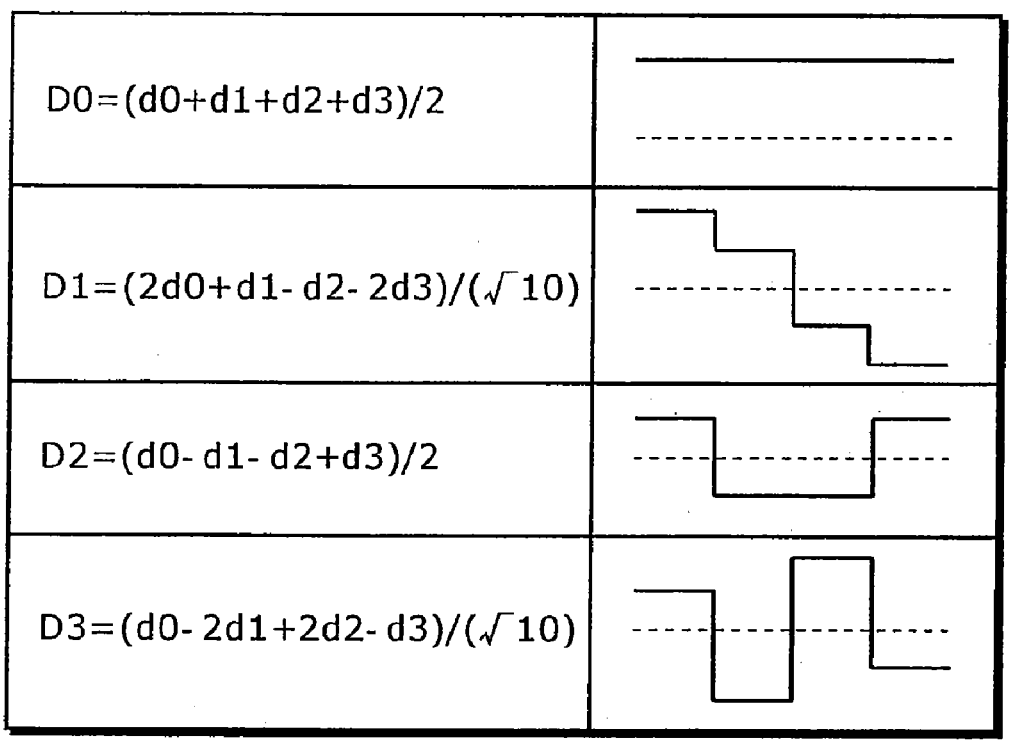
FIG. 9A shows equations used in integer precision DCT.
FIG. 9B shows equations used in integer precision inverse DCT.

FIG. 9A shows the equations used by the orthogonal transformation unit T for integer precision DCT and the wave formed images, each representing the respective equation. "d0"-"d3" present four input signals while "D0"-"D3" present a component on which integer precision DCT is performed. In the integer precision 4×4 DCT, the four inputted DCT shown in FIG. 9A are used once for each row and each column in a 4×4 pixel block.

"D0" is a DC component while "D3" is the highest frequency component. A difference between the wave formed images of the integer precision DCT and those of the Hadamard transform shown in FIG. 8 is noticeable between the frequency components H1 and D1. That is to say, the frequency component D1 (a current component of lowest frequency) is expressed more smoothly (i.e. a gradual change from a maximum value to a minimum value), compared with the frequency component H1.

FIG. 9B shows equations used by the orthogonal transformation unit T for integer precision inverse DCT. In the diagram, actual operations are required in order to obtain D1' and D3' using the frequency components D1 and D3. In the present embodiment, the quantization step in the inverse quantization processing is multiplied in advance by the values (the first step taken by the inverse quantization unit IQ as mentioned above) with the view to avoid actual operations in the integer precision inverse DCT. Thus, the number of multiplications executed for the integer precision inverse DCT is reduced and the amount of loads required for the calculations is also decreased. As a result, in the processing of inverse quantization, the quantization step for the frequency components of odd-numbered degree is ($\sqrt{8}/\sqrt{5}$) times or 8/5 times as many as that of the frequency components of even-numbered degree.

Figure 10A:
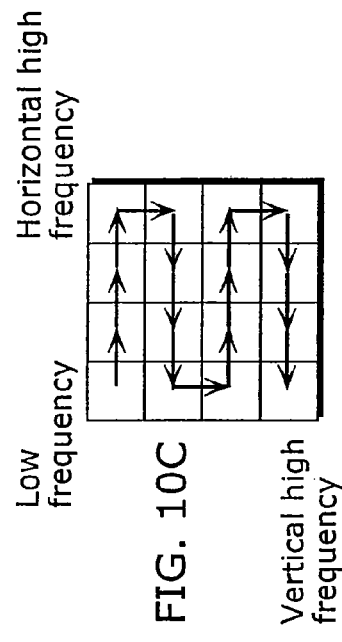
FIGS. 10A-10D respectively shows an example of a coding order in a quantization matrix.
Figure 10B:
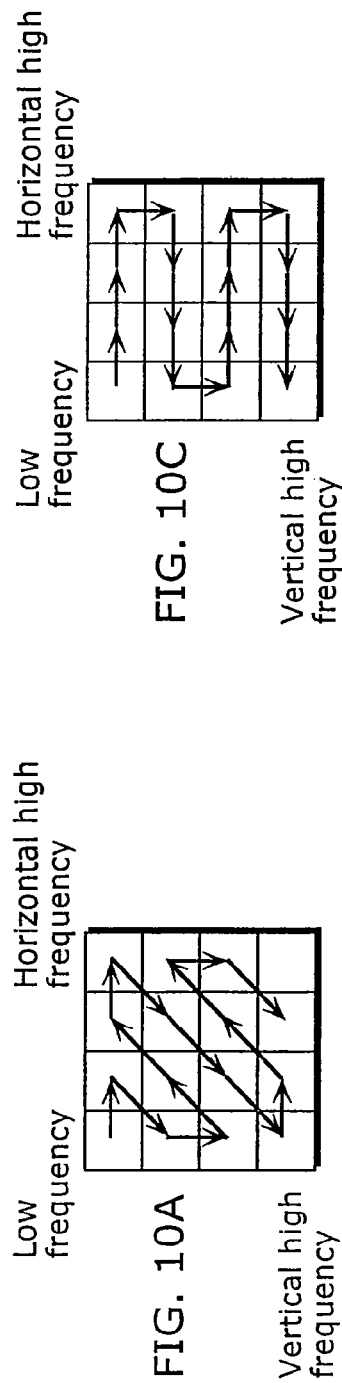
Figure 10C:
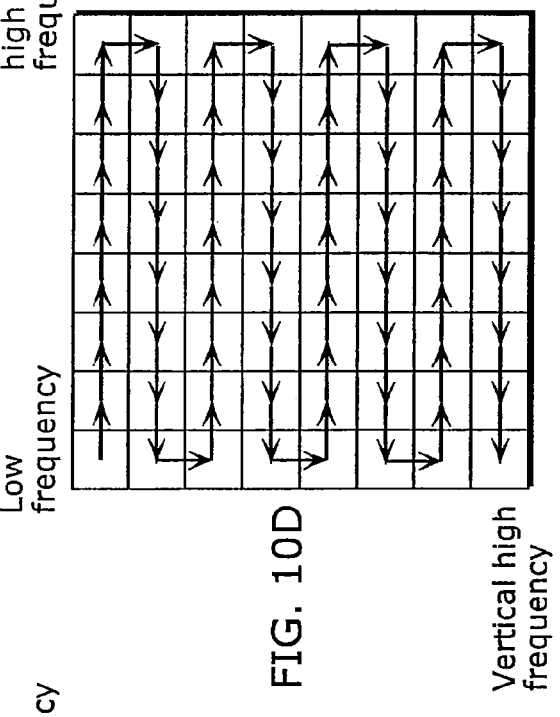
Figure 10D:
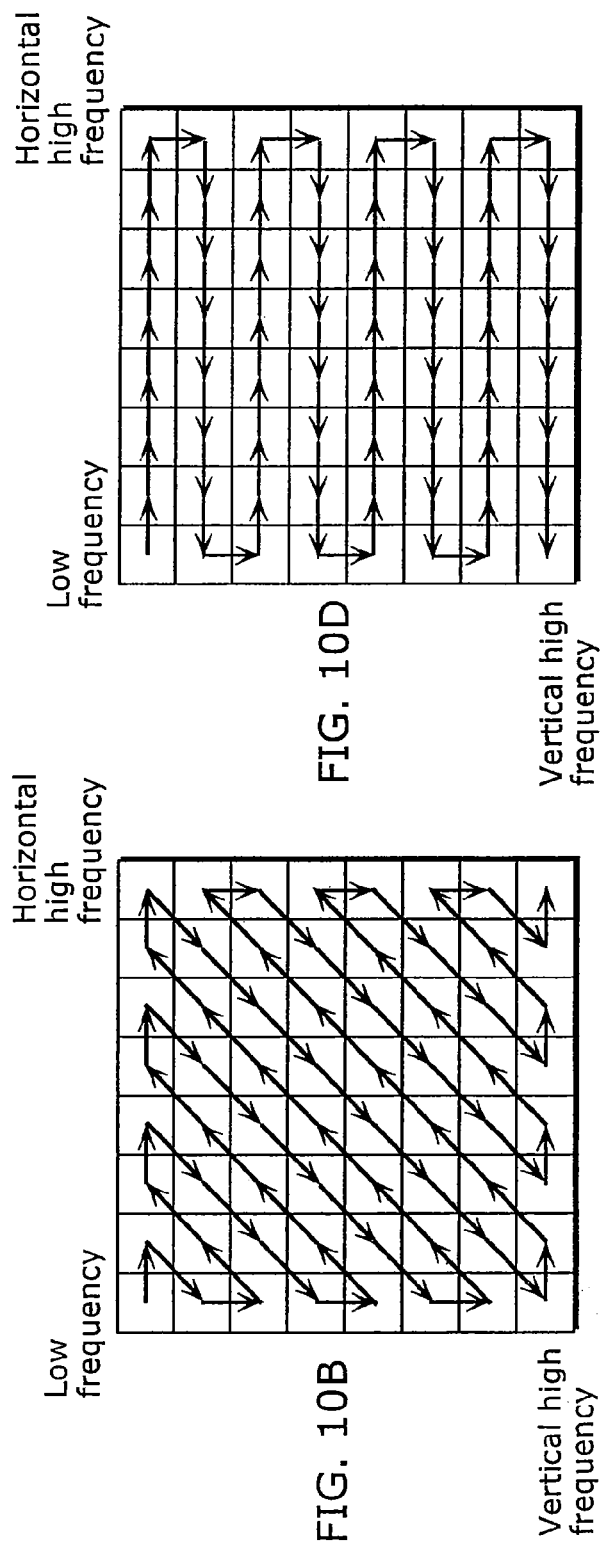

FIGS. 10A-10D respectively shows an example of a coding order in a quantization matrix. This order is used for coding or decoding a quantization matrix, and the quantization matrix is rearranged in the order of the components to be actually operated in the process of quantization and inverse quantization. In the orthogonal transform performed in the picture coding, 4×4 pixels and 8×8 pixels are the two most frequently used units. FIGS. 10A and 10C show examples of using the unit of 4×4 pixels while FIGS. 10B and 10D show examples of using the unit of 8×8 pixels. The compression efficiency is high in the coding that starts from low frequency components towards high frequency components, as shown in FIGS. 10A and 10B, but in some cases, coding in horizontal order, as shown in FIGS. 10C and 10D, can be employed.

Figure 1:
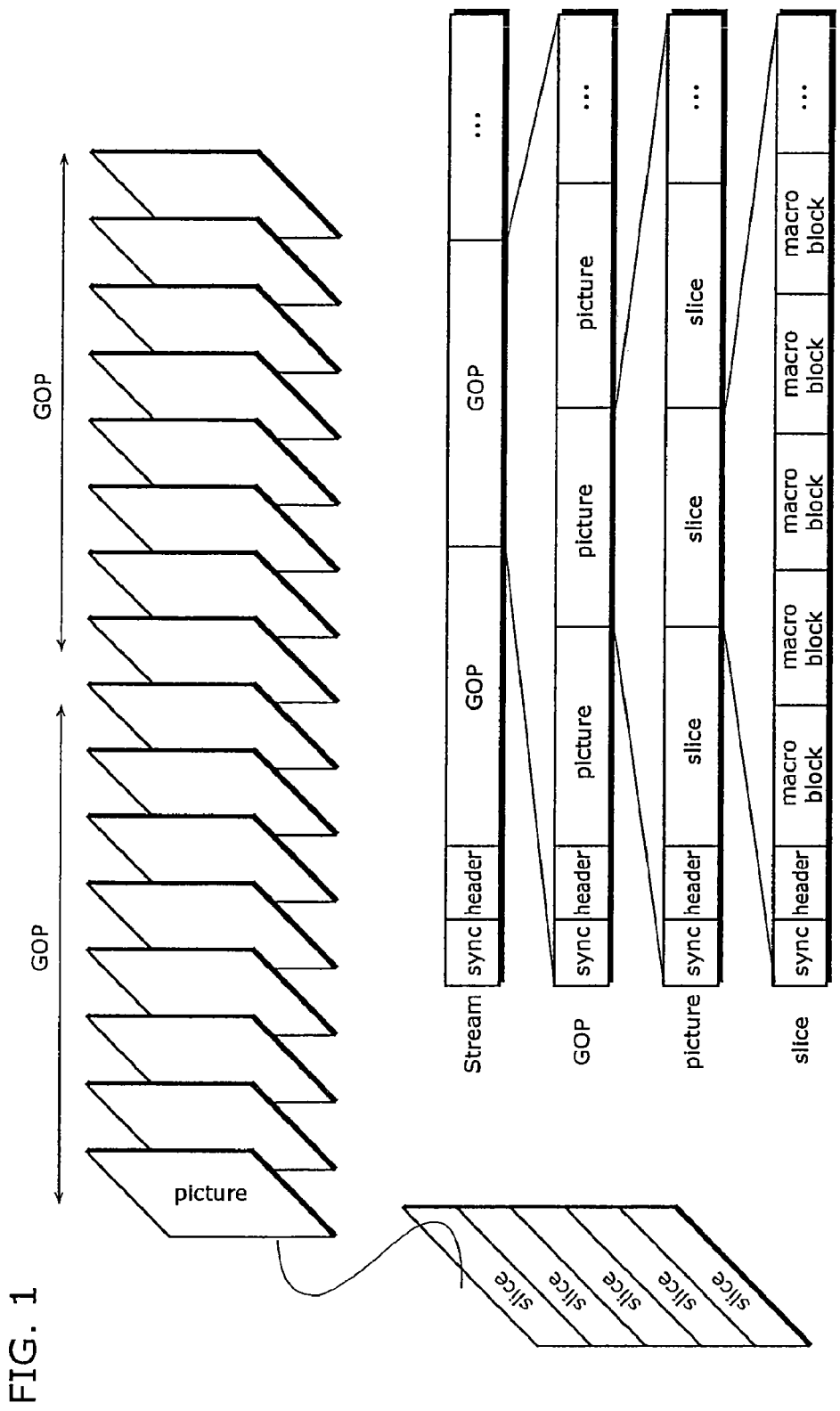
FIG. 1 is a diagram illustrating an example data structure of a bitstream.
Figure 3:
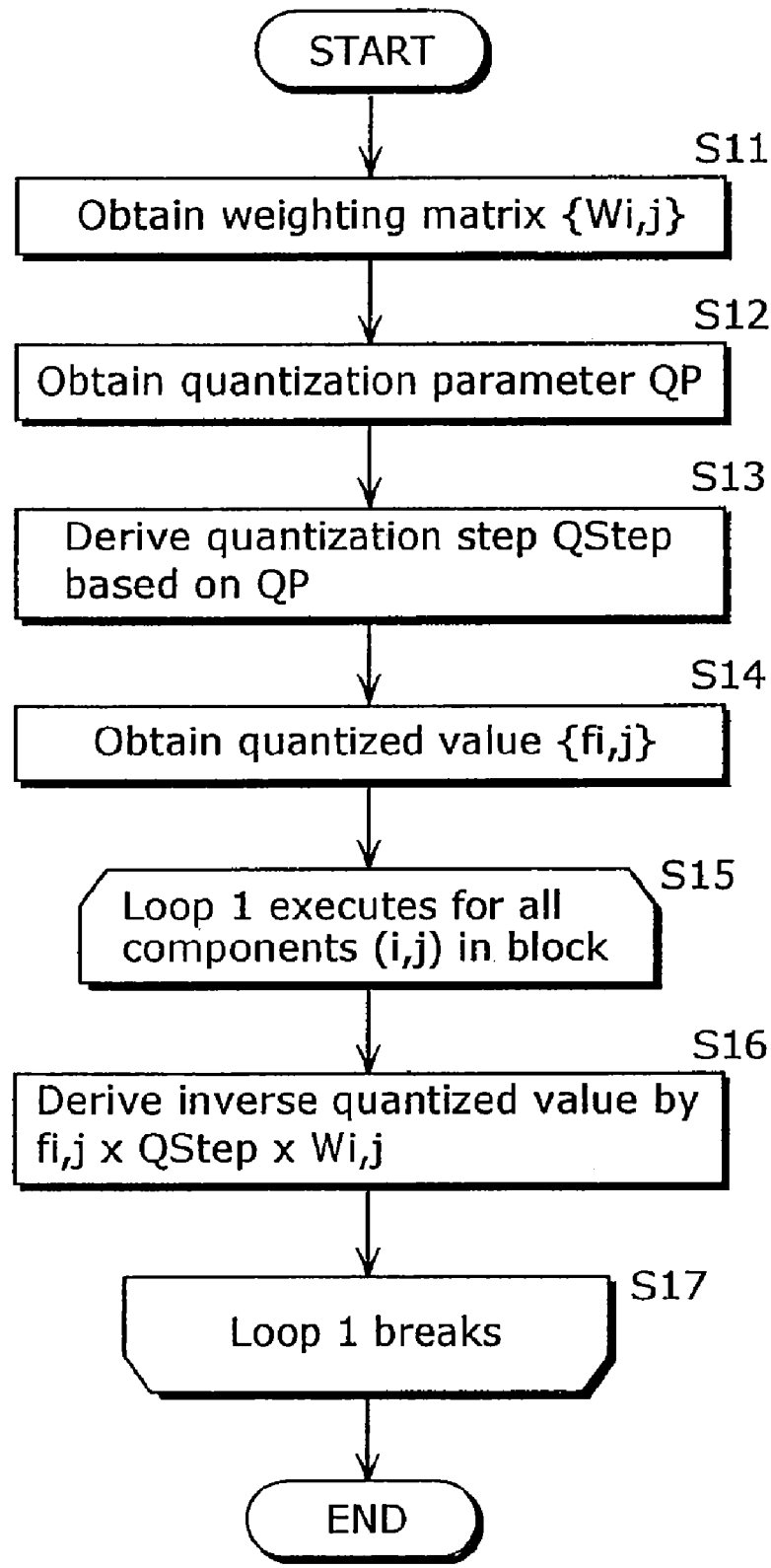
FIG. 3 is a flowchart showing the inverse quantization performed by the conventional picture coding apparatus as presented in the MPEG-2 and MPEG-4.
Figures 11A, 11B, 11C:
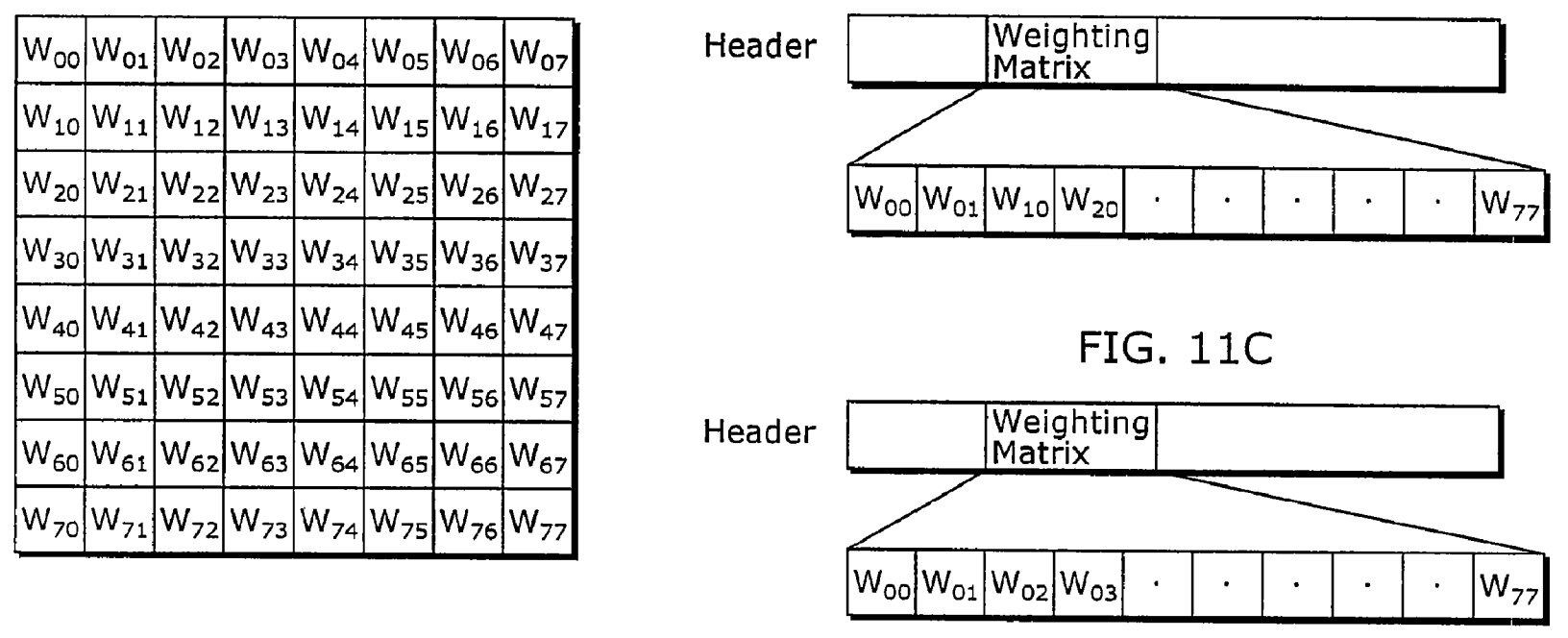

FIGS. 11A-11C shows quantization matrix (i.e. Weighting Matrix) and the data structure of the quantization matrix that is coded while streaming. In the diagram, "Header" denotes a header of "GOP" or "picture" shown in FIG. 1, or the equivalent information. FIG. 11A shows arrays of frequency components in the quantization matrix. "Wi,j" denotes the components in a row "i", and a column "j" in the quantization matrix. FIGS. 11B and 11C respectively shows an example of how the coded data for each component in the quantization matrix is placed in the header. "WeightingMatrix" denotes a bitstream obtained by coding the quantization matrix. FIG. 11B shows the stream obtained by coding the quantization matrix in the order shown in FIG. 10B while FIG. 11C shows the stream obtained by coding the quantization matrix in the order shown in FIG. 10D. Note that "Wi,j" in the stream shown in FIGS. 11B and 11C denotes a coded variable length code in a position presented by "Wi,j" within the quantization matrix.

Figure 12:
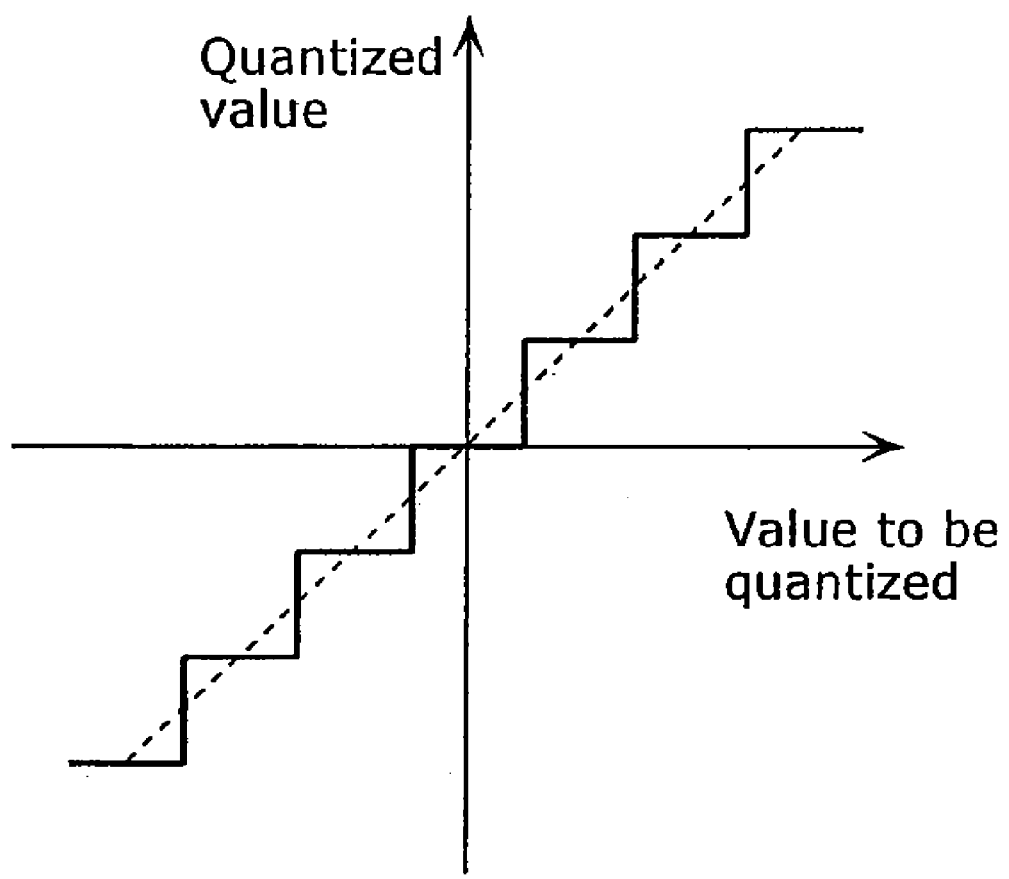
FIG. 12 shows input-output characteristics of the quantization.

FIG. 12 is a diagram showing input-output characteristics of the quantization (or inverse quantization) performed by the quantization unit Q and the inverse quantization unit IQ. Quantization means to round off the result of dividing the orthogonal transformed frequency component (a value to be quantized in FIG. 12) by the quantization step so as to turn the frequency component into an integer. The rounded-off integer is called a quantization value. Inversely, putting the value to be quantized back into a frequency component is called "inverse quantization". By changing the size of the quantization step, it is possible to increase or decrease the bit amount resulted from the coding. Thus, by changing the size of the quantization step, it is possible to maintain the same compression ratio (i.e. an amount of codes per unit time).

Figure 13:
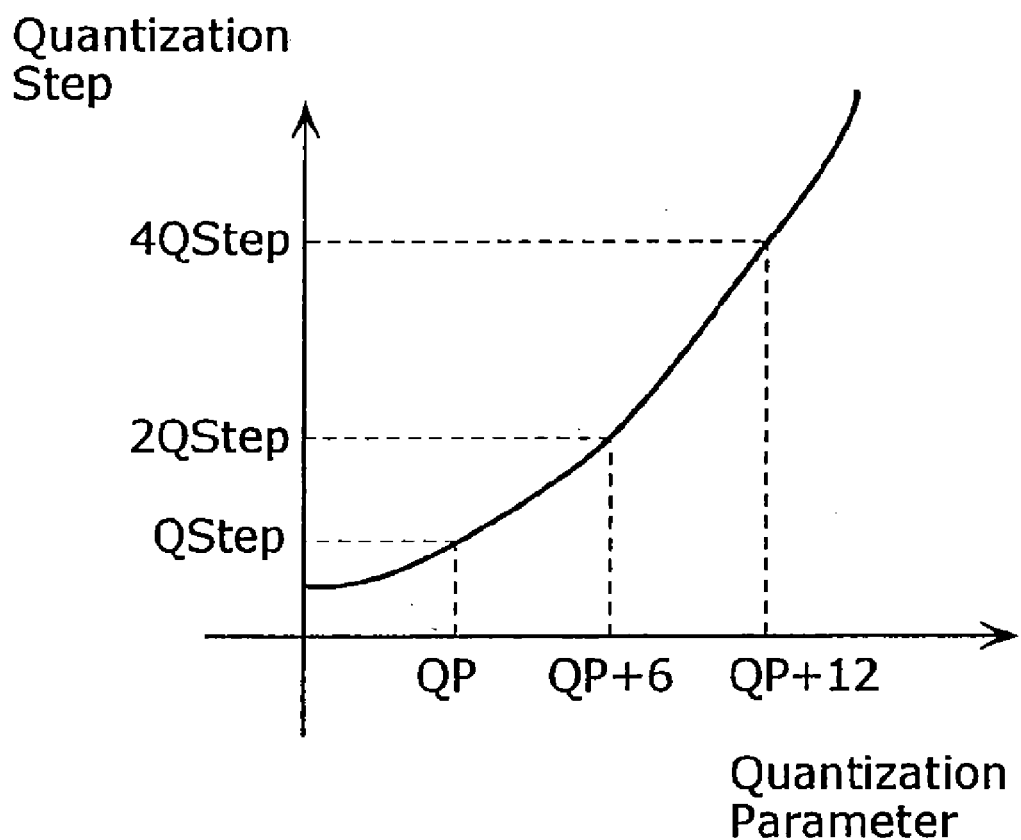
FIG. 13 shows a characteristic of quantization step which changes according to quantization parameter.
Figure 14:
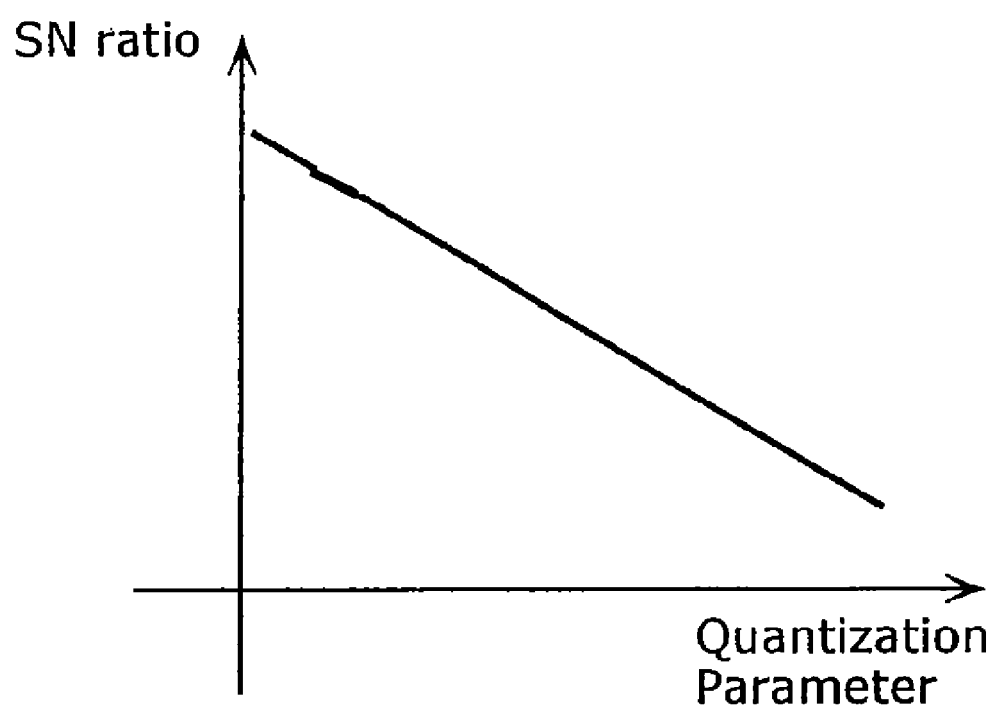
FIG. 14 shows a characteristic of SN ratio which changes according to the quantization parameter.

FIG. 13 shows a characteristic of quantization step against quantization parameter. Quantization parameter serves to derive a quantization step, and is adjusted in order to let an amount of codes correspond to a bit rate. The inverse quantization unit IQ and the quantization unit Q derive a quantization step using the quantization parameter to be coded, since the quantization step is not directly coded. In the example shown in FIG. 13, the quantization step is doubled as the quantization parameter QP is increased by six. As a result, the quantization parameter QP becomes proportional to the SN ratio, and the amount of change in SN ratio is maintained at the same level, as shown in FIG. 14, regardless of the value of the quantization parameter QP in the case where the quantization parameter QP changes.

Note that in the case where the quantization parameter indicates a value ranged from 0 to 51, a maximum value of the quantization step indicates a value 256 times as large as the minimum value.

FIGS. 15A to 15C are diagrams for explaining normalization and inverse quantization. The following describes a method for simplifying, in the processing of inverse quantization, the multiplication using ($\sqrt{8}/\sqrt{5}$) for normalization in the orthogonal transform shown in FIG. 9B. As shown in FIG. 9B, the components D1 and D3 are located in the Nth place (N is an odd number). The components which are located in the Nth place both in horizontal and vertical directions are multiplied for two times by ($\sqrt{8}/\sqrt{5}$). This means that the components are multiplied by 8/5. Based on this, a quantization step should be multiplied in advance for the normalization operated beforehand in the processing of inverse quantization, as shown in the following (a) to (c).

(a) Multiplication for normalization is not executed in the case where a component is located in the Mth (M is an even number) place both in horizontal and vertical directions.

(b) Multiply a component by ($\sqrt{8}/\sqrt{5}$) in the case where the component is located in the Nth (N is an odd number) place either in horizontal or vertical direction.

(c) Multiply a component by 8/5 in the case where the component is located in the Nth (N is an odd number) place both in horizontal and vertical directions.

Now, given that $\beta=\alpha\times\sqrt{8}/\sqrt{5}$, $\gamma=\alpha\times8/5$, (a) to (c) are changed into the following (A) to (C).

(A) Multiply a component by α in the case where the component is located in the Mth (M is an even number) place both in horizontal and vertical directions.

(B) Multiply a component by β in the case where the component is located in the Nth (N is an odd number) place either in horizontal or vertical direction.

(C) Multiply a component by γ in the case where the component is located in the Nth (N is an odd number) place both in horizontal and vertical directions.

With such simple rules, it is possible to realize normalization together in the processing of inverse quantization. The special multiplication for normalization becomes unnecessary in the processing of inverse DCT and quantization.

When the quantization parameter QP increases by 6, the quantization step is doubled. The relationship between the quantization parameter QP and the quantization step obtained by calculations that include multiplications for normalization is, therefore, expressed by the following equation.

quantization step=(quantization step of QP % 6)× $(2^{(QP/6)})$

Based on this, the quantization step that involves normalization can be easily obtained, as shown in FIG. 15B, by left shifting "quantization step of QP % 6" by "QP/6" bits, as a quantization step corresponding to an arbitrary quantization parameter QP (i.e. a quantization step that involves multiplications for normalization). This can be realized by keeping only a total of 18 quantization steps for "quantization step of QP % 6" corresponding to α, β, and γ, respectively, as shown in FIG. 15C. In the present embodiment, the ratio between the size of the quantization parameter for a luminance signal and that of the quantization parameter for a chrominance signal shall be changed on a per-slice basis. The degradation of color (especially red) being visually apparent than that of luminance, it is preferable that the quantization parameter QP of the chrominance signal be smaller than that of the luminance signal.

Figure 16A:
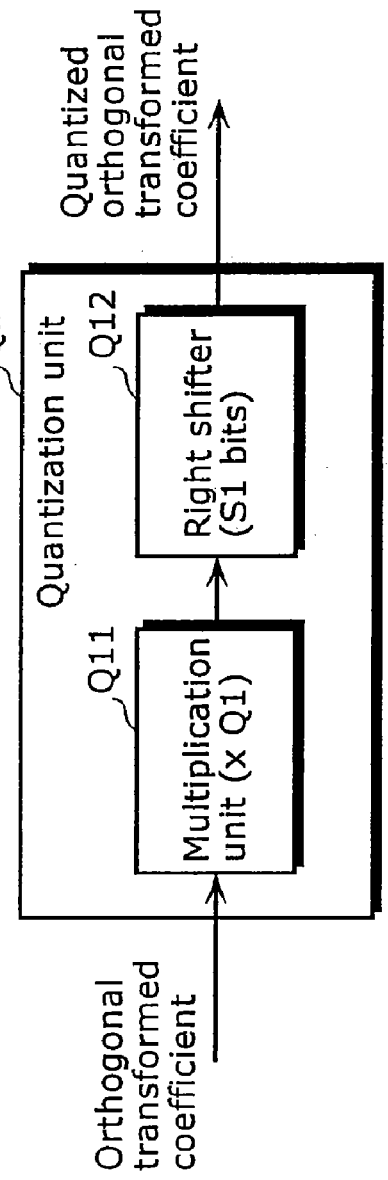
FIG. 16A is a block diagram showing a first example structure of a quantization unit.
Figure 16B:
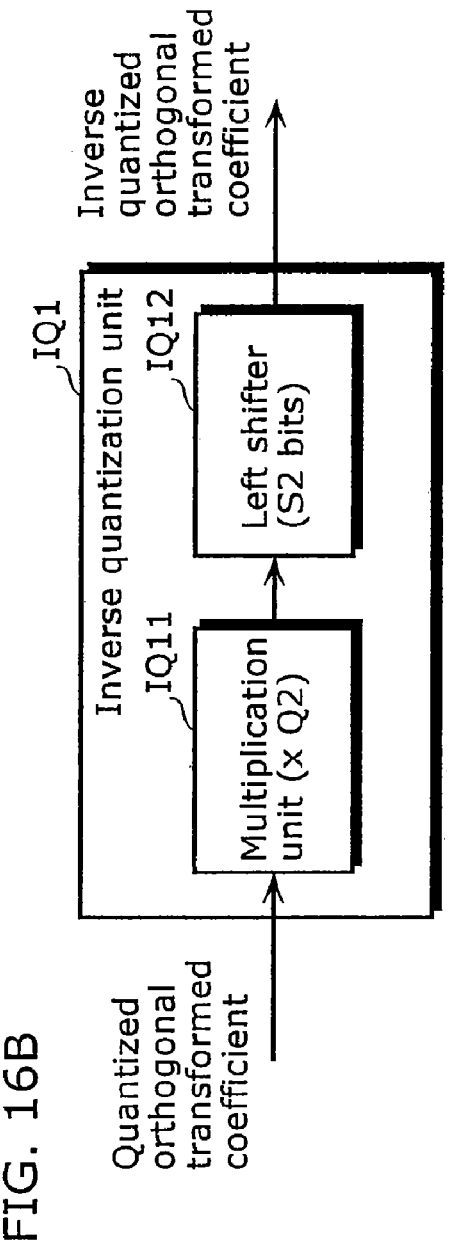
FIG. 16B is a block diagram showing a first example structure of an inverse quantization unit.

Apparently, quantization and inverse quantization can be expressed with a combination of multiplication and shift operation owing to the fact that the quantization step can be expressed by shifting it by Q/P6 bits. FIGS. 16A and 16B are block diagrams showing the first example structures of the quantization unit Q and the inverse quantization unit IQ. In the first examples, only multiplications and shift operations are used in the case where a weighting matrix is not employed. A quantization unit Q1 includes a multiplication unit Q11 and a right shifter Q12. The multiplication unit Q11 multiplies an orthogonal transformed coefficient by Q1. "Q1" is a multiple of an inverse number of the quantization step (a quantization step of QP % 6). The quantization step is usually used for the division performed in the quantization, however, the Inverse number of the quantization step is calculated in advance to multiply since the operation of devision is more complicated than that required of multiplication. An inverse quantization unit IQ1 includes a multiplication unit IQ11 and a left shifter IQ12.

The quantization unit Q1 operates as follows. The right shifter Q12 right shifts, by S1 bits, the result of the multiplication executed by the multiplication unit Q11. That is to say that the right shifter Q12 divides, by $2^{S1}$, the result of the multiplication executed by the multiplication unit Q11. The value of S1 changes in proportion to QP/6. The inverse quantization unit IQ1 operates as follows. The multiplication unit IQ11 multiplies an orthogonal transformed coefficient by Q2. The value of "Q2" changes in propotion to a quantization step of QP % 6. The left shifter IQ12 left shifts, by S1 bits, the result of the multiplication executed by the multiplication unit IQ11. That is to say that the left shifter IQ12 multiplies, by $2^{S2}$, the result of the multiplication executed by the multiplication unit Q11. The value of "S2" changes in proportion to QP/6.

Here, "S1" and "S2" are values that are fixed for all the frequency coefficients, each changing according to the quantization parameter QP. "Q1" and "Q2" have values that depend on the quantization parameter QP and the position of a frequency coefficient. In this case, it is required that the relationship expressed by $Q1 \times (2^{-S1}) \times Q2 \times (2^{-S2})=1$ be fulfilled. In this case, Q1×Q2 results in an exponential in binary and S2−S1 is obtained as a fixed value.

Figure 17A:
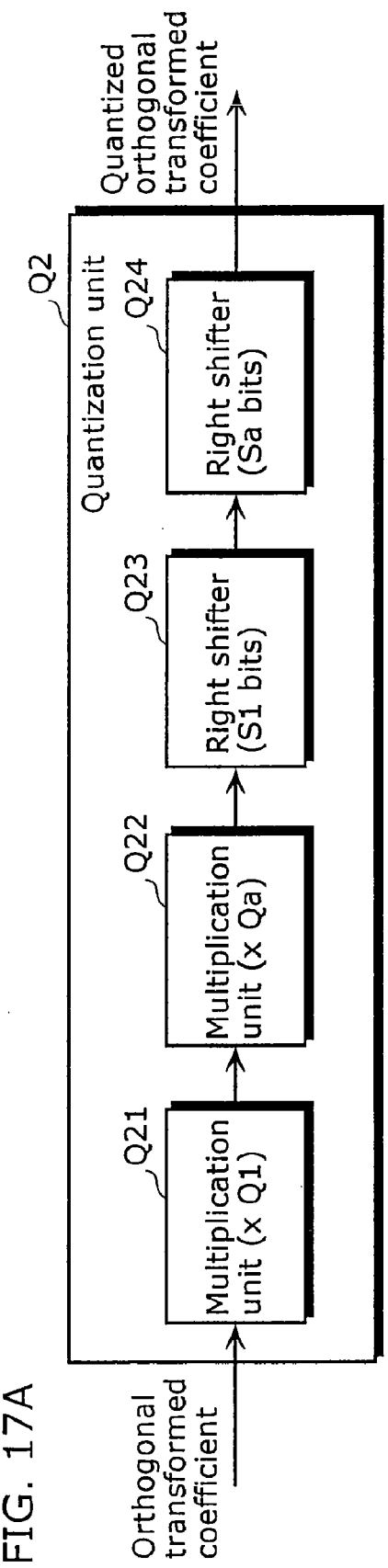
FIG. 17A is a block diagram showing a second example structure of the quantization unit that is adapted to the weighting matrix.
Figure 17B:
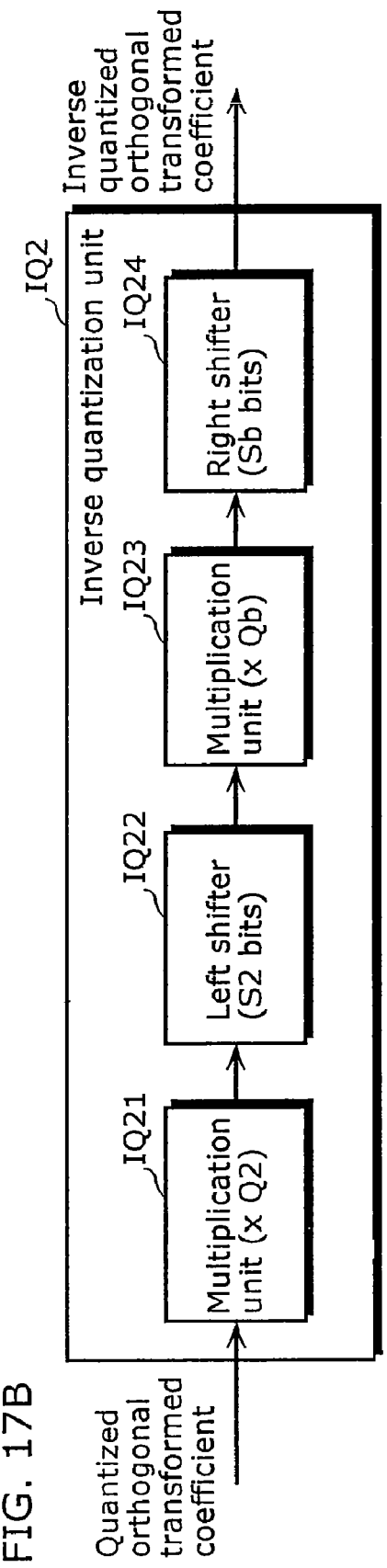
FIG. 17B is a block diagram showing a second example structure of the inverse quantization unit that uses the weighting matrix.

FIGS. 17A and 17B are block diagrams showing second example structures of the quantization unit Q and the inverse quantization unit IQ in the case of using a weighting matrix. A quantization unit Q2 includes: a multiplication unit Q21 that multiplies a frequency coefficient by Q1; a multiplication unit Q22 that multiplies, by Qa, the result of the multiplication executed by the multiplication unit Q21; a right shifter Q23 that right shifts, by S1 bits, the result of the multiplication executed by the multiplication unit Q22; and a right shifter Q24 that right shifts, by Sa bits, the result of shifting executed by the right shifter Q23. An inverse quantization unit IQ2 includes: a multiplication unit IQ21 that multiplies a quantized frequency coefficient by Q2; a left shifter Q22 that left shifts, by S2 bits, the result of the multiplication; a multiplication unit IQ23 that multiplies, by Qb, the result of the shifting executed by the left shifter Q22; and a right shifter IQ24 that right shifts, by Sb bits, the result of the shifting executed by the left shifter Q22.

Figure 18A:
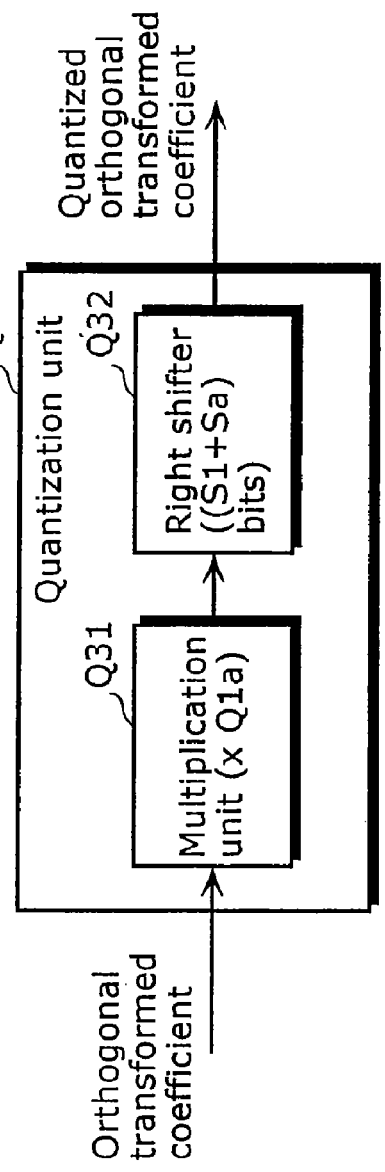
FIG. 18A is a block diagram showing a third example structure of the quantization unit that uses the weighting matrix.
Figure 18B:
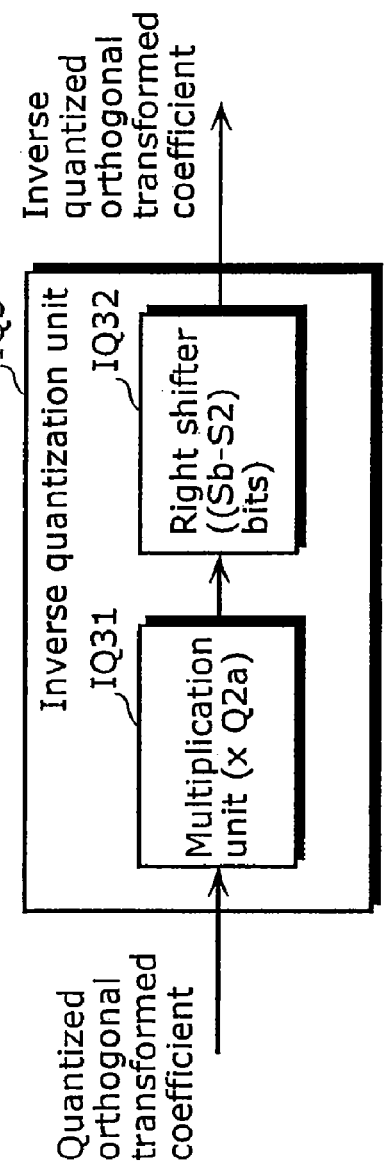
FIG. 18B is a block diagram showing a third example structure of the inverse quantization unit that uses the weighting matrix.

Here, "Qa" and "Sa" correspond to the weighting components Wi,j in the specified weighting matrix, and the following relationship can be established: $Qa \times 2^{-Sa} \times Qb \times 2^{-Sb}=1$ FIGS. 18A and 18B are block diagrams showing third example structures of the quantization unit Q and the inverse quantization unit IQ in which the structures shown in FIGS. 17A and 17B are simplified so as to perform multiplication and shift operation together. A quantization unit Q3 in the diagram includes: a multiplication unit Q31 that multiplies an orthogonal transformed coefficient by Q1a; and a right shifter Q32 that right shifts, by "S1+Sa", the result of the multiplication executed by the multiplication unit Q31. An inverse quantization unit IQ3 includes: a multiplication unit IQ31 that multiplies, by Qa, an orthogonal transformed coefficient that is quantized; and a right shifter IQ32 that right shifts, by "Sb−S2", the result of the multiplication executed by the multiplication unit IQ31. The multiplication unit IQ31 executes two multiplications respectively by Q1 and Qa shown in FIG. 17A, by the execution of one multiplication by Q1a. Namely, the execution is performed using the following equation: Q1b=Q1×Qb. The right shifter Q32 executes two right shifts respectively by S1 bits and Sa bits, by the execution of one shift. The multiplication unit IQ31 executes two multiplications respectively by Q2 and Qb, by the execution of one multiplication by Q2b. Namely, the execution is performed using the following equation: Q2b=Q2×Qb. The right shifter IQ32 executes the left shift by S2 bits and the right shift by Sb bits, by the execution of one shift.

Figure 19:
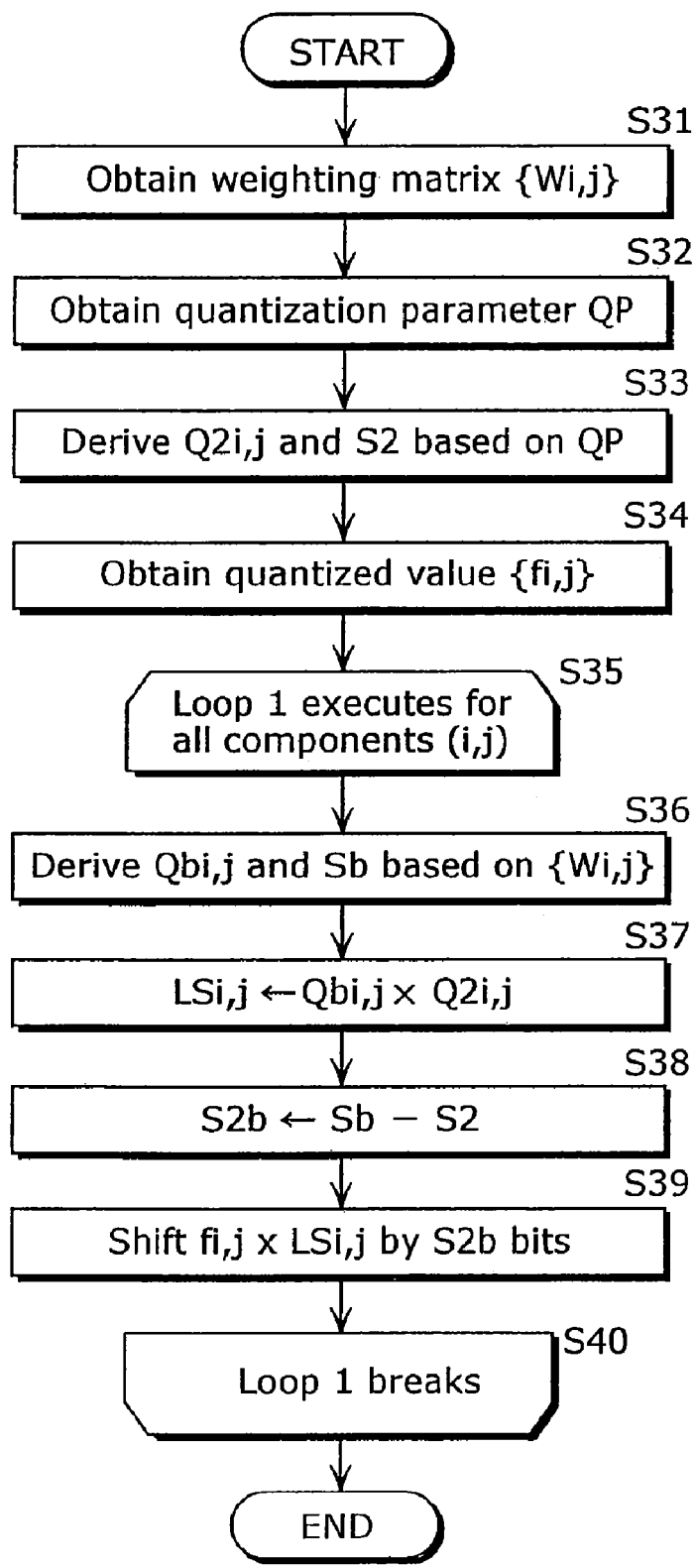
FIG. 19 is a flowchart showing the processing of inverse quantization in the case where calculations of each quantization step including a multiplication for frequency transformation is carried out for each component of (i,j) based on a quantization parameter QP.

FIG. 19 is a flowchart showing inverse quantization in the case where the calculation for a quantization step including multiplications for frequency transform is performed for each component of (i,j) based on a quantization parameter QP. The inverse quantization is performed on a block basis by the inverse quantization unit IQ3 (or IQ2), for example.

Firstly, the inverse quantization unit IQ3 obtains a weighting matrix {Wi,j} and a quantization parameter QP (S31, S32). Then, the inverse quantization unit IQ3 further derives {Q2$i,j$} and S2, as the quantization step obtained by calculations including multiplications for frequency transform, from the quantization parameter QP (S33), and obtains a quantized value (a quantized frequency coefficient) {f$i,j$} (S34). Here, {Q2$i,j$} is obtained as the quantization step of QP % 6. S2$b$ is obtained using QP/6.

Next, the inverse quantization unit IQ3 performs, in Loop 1 (S35-S40), quantization for each frequency coefficient in a block. Namely, the inverse quantization unit IQ3 derives {Qb$i,j$} and Sb based on the weighting matrix {W$i,j$} (S36), and obtains a level scale LS$i,j$ by multiplying Qb$i,j$ and Q2$i,j$ (S37). The inverse quantization unit IQ3 further obtains S2$b$, a number of bits to be shifted for shifting all at once, by subtracting S2 from Sb (S38), and calculates an inverse quantized value by multiplying the quantized value f$i,j$ and the level scale LS$i,j$ and then left shifts the result of the multiplication by S2$b$ bits (S40).

Thus, inverse quantization can be performed by a simple method of performing inverse quantizing on a quantization step obtained by calculations including multiplications for frequency transform while calculating the quantization step using the quantization parameter QP.

Figure 20:
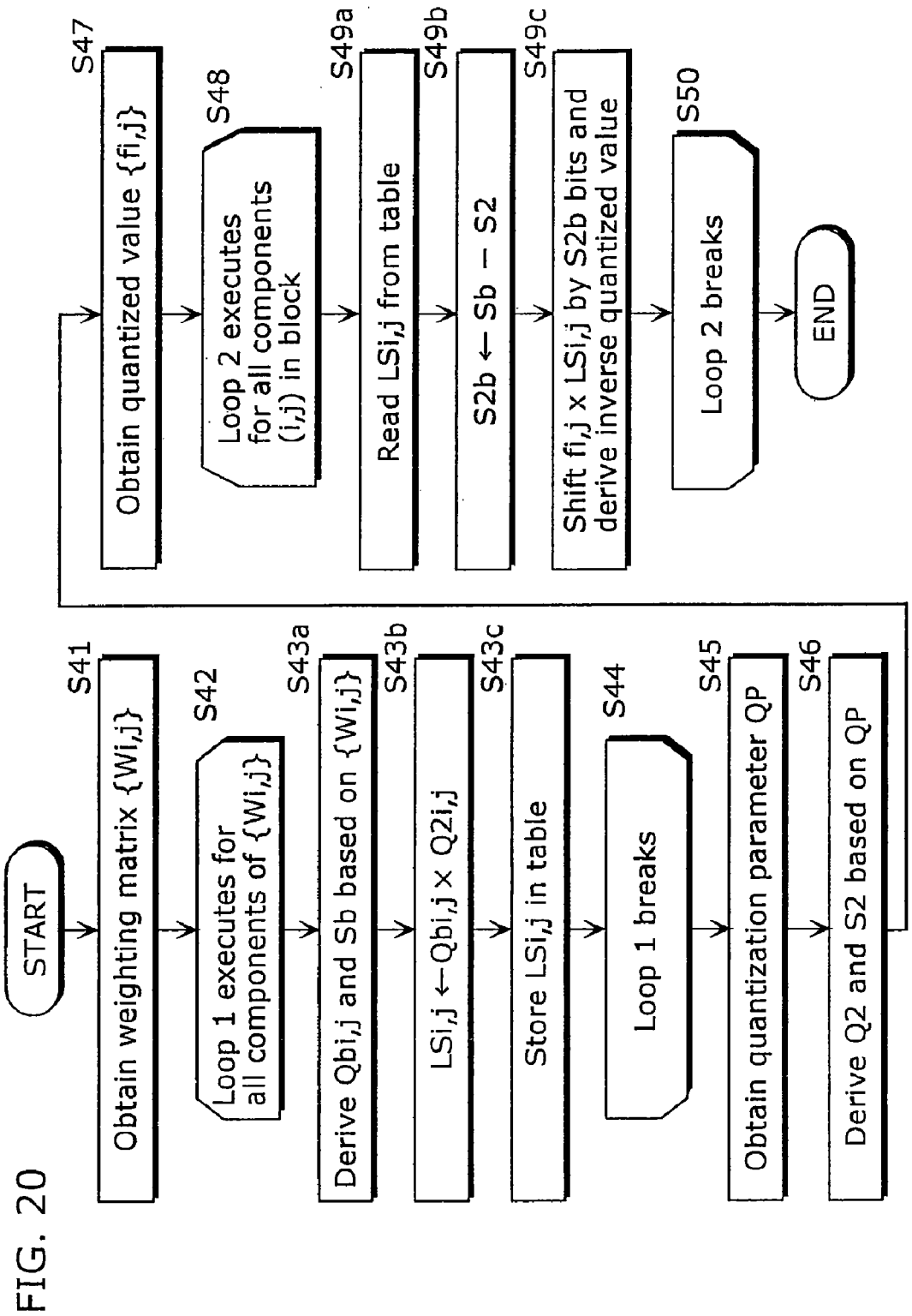
FIG. 20 is a flowchart showing the quantization in the case where calculations of each quantization step including a multiplication for frequency transformation is carried out in advance based on quantization parameter QP.

FIG. 20 is a flowchart showing the quantization processing in the case where the quantization step obtained by calculations including multiplications for frequency transform is calculated in advance using a quantization parameter QP. The inverse quantization is performed, for instance, by the inverse quantization unit IQ3 (or IQ2). The difference between FIG. 20 and FIG. 19 is that all the quantization steps LS$i,j$, each being obtained by calculations including multiplications for frequency transform are stored, on a per-picture basis, in a memory as a table (S43$c$ in Loop1), and that the LS$i,j$ is read out from the table (S49$a$ in Loop 2). The other operations are almost as same as those in FIG. 19 so that the description is omitted. According to the inverse quantization of the present embodiment, all the quantization steps LS$i,j$, each being obtained by calculations including multiplications for frequency transform, are stored in a memory as a table in Loop 1, it is suitable for calculating an inverse quantization value on a block basis with high speed.

Figure 21:
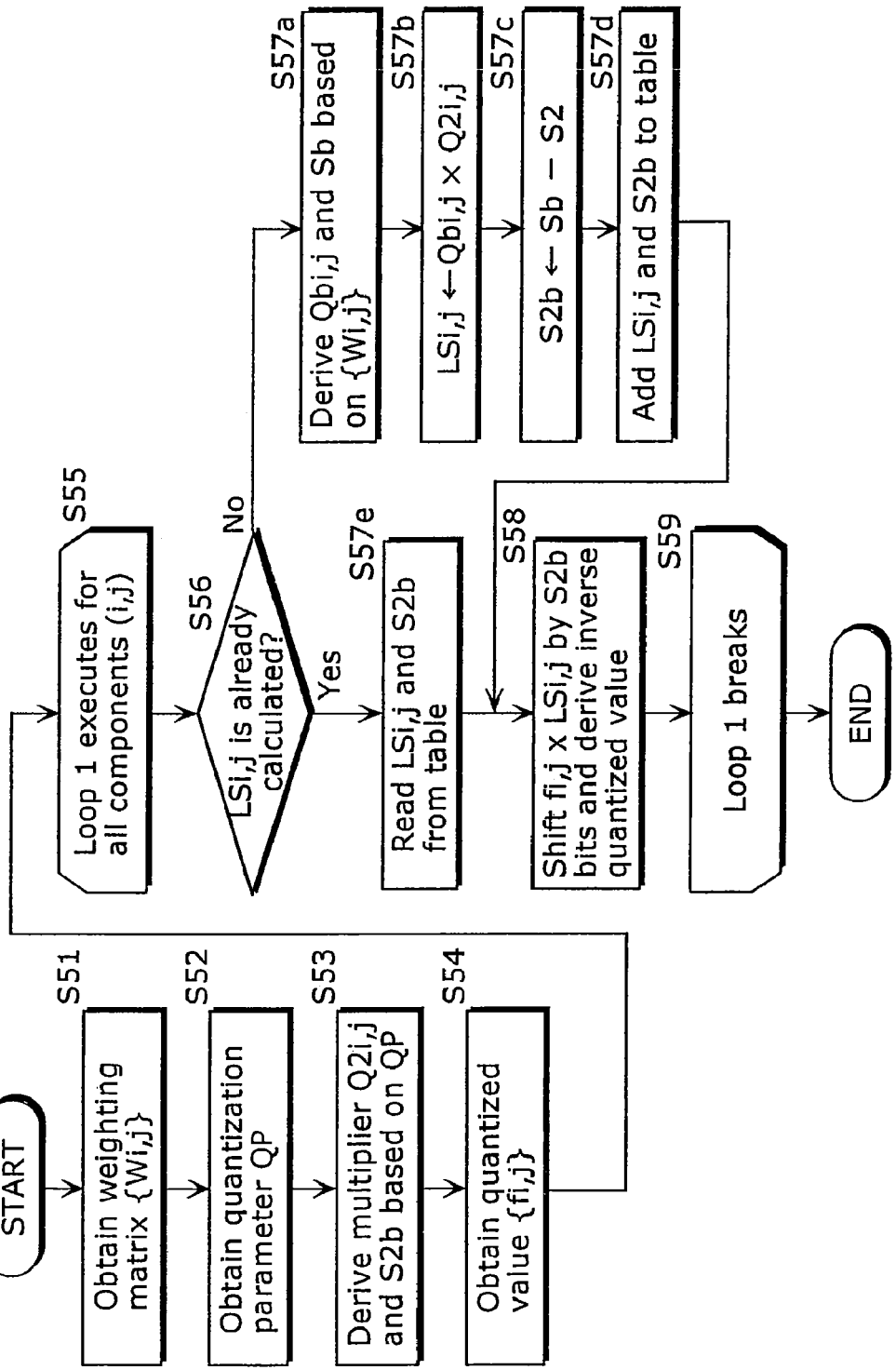
FIG. 21 is a flowchart showing the quantization in the case where calculations of each quantization step including a multiplication for frequency transformation is carried out, as necessary, based on quantization parameter QP.

FIG. 21 is a flowchart showing the quantization processing in the case where the quantization step obtained by calculations including multiplications for frequency transform is calculated, as necessary, based on a quantization parameter QP. The inverse quantization is performed, for example, by the inverse quantization unit IQ3 (or IQ2). The difference between FIG. 19 and FIG. 21 is that a free area is allocated for the table in the memory at the time of initialization, and that whether or not the quantization step LS$i,j$ obtained by calculations including multiplications for frequency transform is stored in the table (S56). In the case where it is judged that the quantization step LS$i,j$ and the number of bits to be shifted S2$b$ are not stored, LS$i,j$ and S2$b$ are calculated (S57$a$-S57$c$) and the obtained LS$i,j$ and S2$b$ are added to the table (S57$d$), whereas, in the case where it is judged that the quantization step LS$i,j$ is stored, LS$i,j$ and S2$b$ are read out from the table (S57$e$). According to the inverse quantization of the present embodiment, as compared with FIG. 20, it is possible to reduce the amount of calculations to the minimum requirement for the following blocks among which a quantization parameter QP is used in common, in spite that, for the first block, the amount of calculations varies more or less depending on a component.

Figure 22:
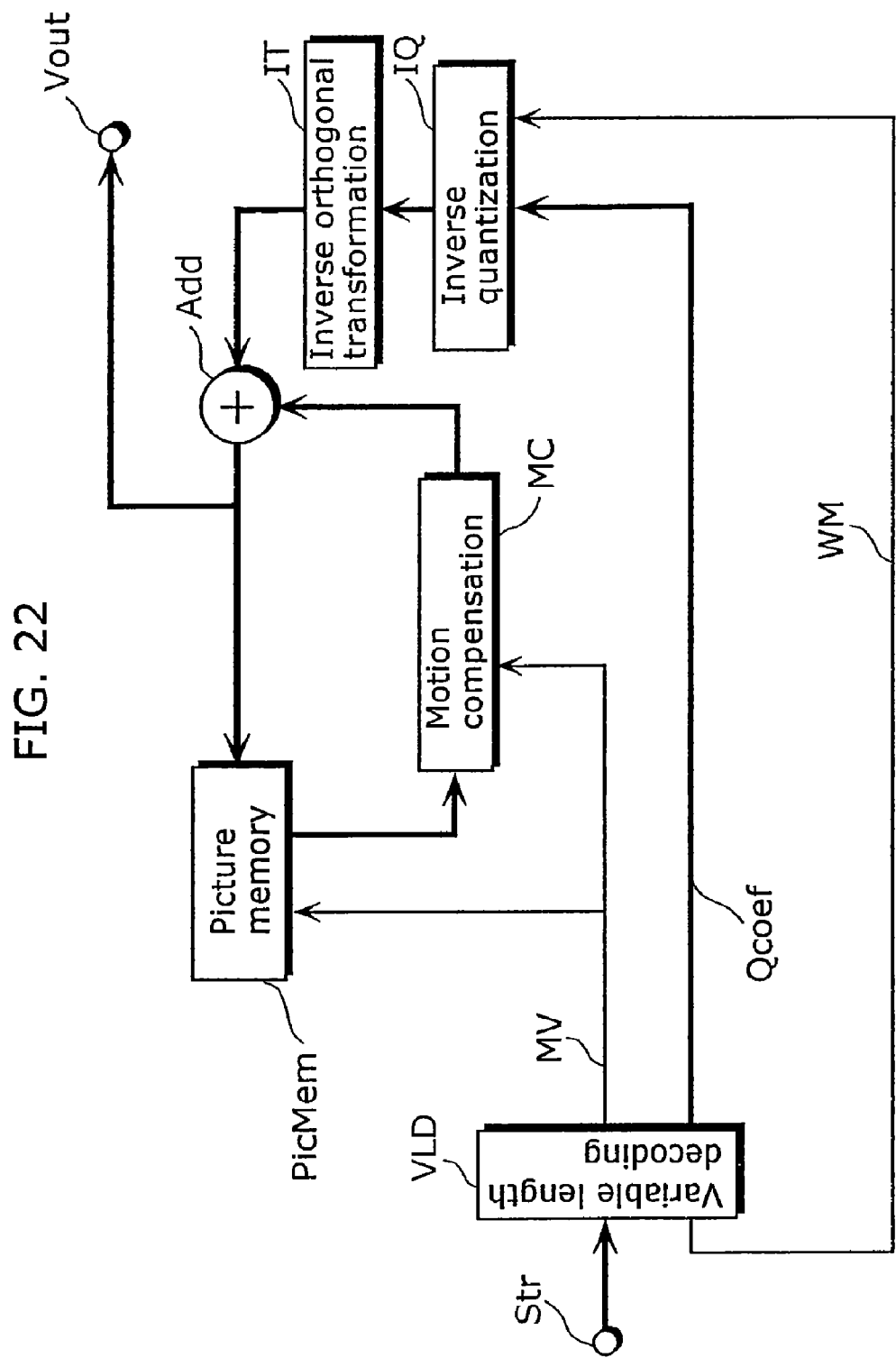
FIG. 22 is a block diagram showing the structure of a picture decoding apparatus.

FIG. 22 is a block diagram showing the structure of the picture decoding apparatus according to the present embodiment. In the diagram, same numbers are put for the units that operate in the same manner as those included in the picture coding apparatus shown in the block diagram in FIG. 4, and the description is omitted. The inverse quantization unit IQ and the inverse orthogonal transformation unit IT are as same as those shown in FIG. 4, and the operations are already explained therein.

Furthermore, the processing shown in the above embodiment can be carried out easily in an independent computer system by recording a program for realizing the moving picture coding/decoding methods described in each of the above embodiment onto a storage medium such as a flexible disk or the like.

Figure 23A:
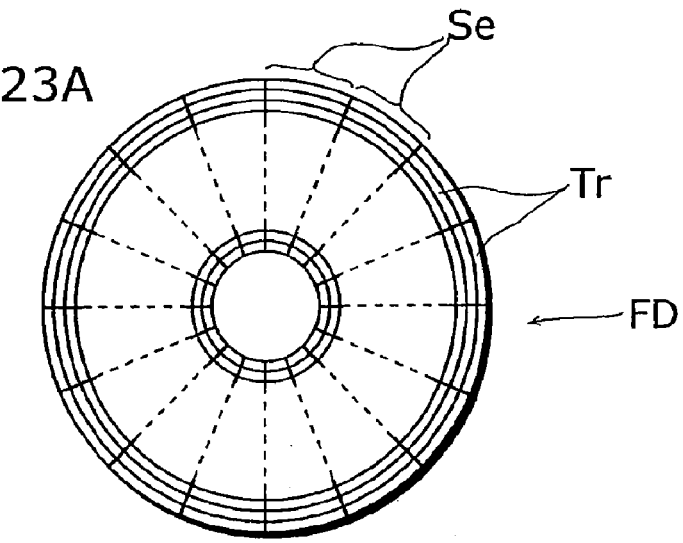
FIGS. 23A-23C are illustrations of a storage medium that stores a program.
Figure 23B:
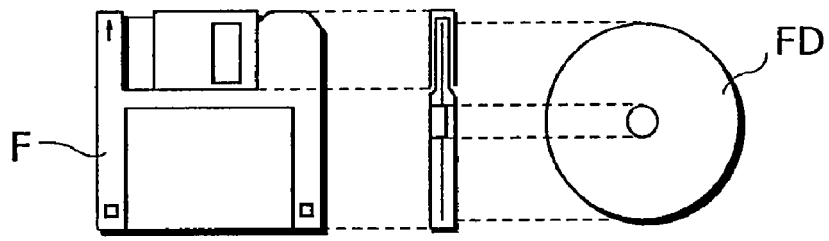
Figure 23C:
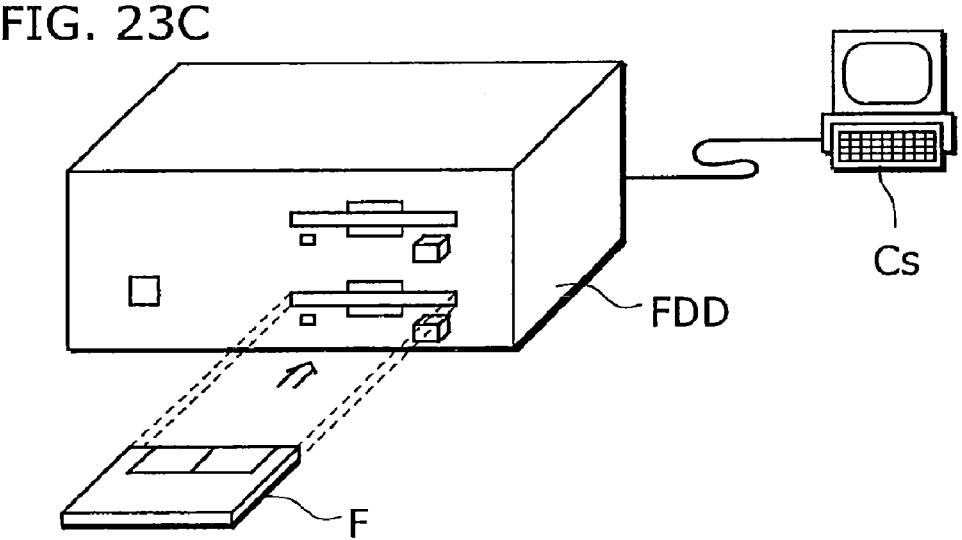

FIGS. 23A, 23B and 23C are illustrations for realizing the moving picture coding/decoding method described in the above embodiment, using a program stored in a storage medium such as a flexible disk in a computer system.

FIG. 23B shows a full appearance of a flexible disk, its structure at cross section and the flexible disk itself whereas FIG. 23A shows an example of a physical format of the flexible disk as a main body of a storage medium. A flexible disk FD is contained in a case F with a plurality of tracks Tr formed concentrically from the periphery to the inside on the surface of the disk, and each track is divided into 16 sectors Se in the angular direction. Thus, the moving picture coding method and the moving picture decoding method as the program are recorded in an area assigned for it on the flexible disk FD.

FIG. 23C shows a configuration for recording and reproducing the program on the flexible disk FD. When the program is recorded on the flexible disk FD, the computer system Cs writes in the moving picture coding and decoding methods as the program via a flexible disk drive FDD. When the moving picture coding and decoding methods are constructed in the computer system using the program on the flexible disk, the program is read out from the flexible disk and then transferred to the computer system by the flexible disk drive FDD.

The above explanation is made on an assumption that a storage medium is a flexible disk, but the same processing can also be performed using an optical disk. In addition, the storage medium is not limited to a flexible disk and an optical disk, but any other medium such as an IC card and a ROM cassette capable of recording a program can be used.

The following is a description for the applications of the moving picture coding and decoding methods illustrated in the above-mentioned embodiment and a system using them.

Figure 24:
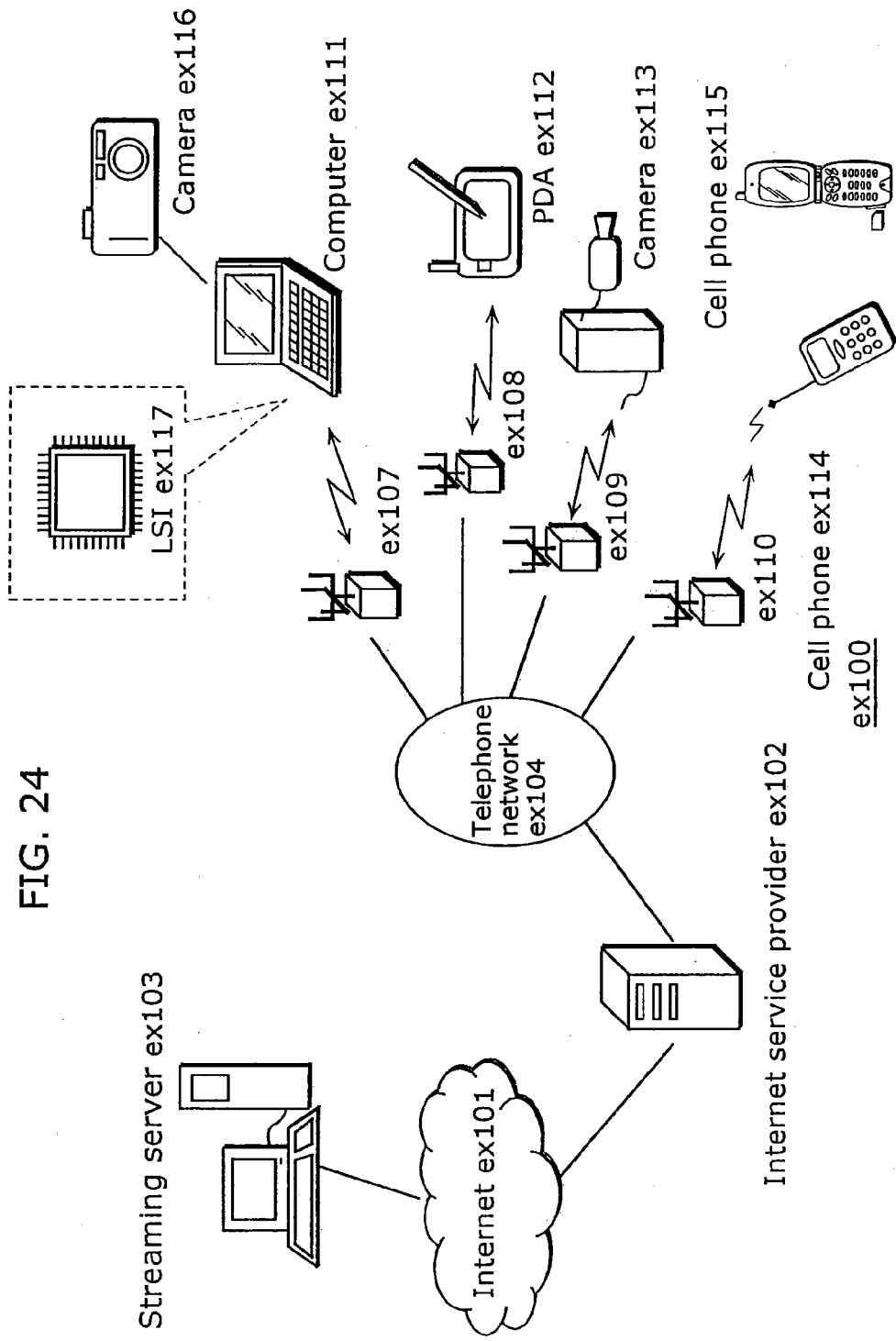
FIG. 24 is a block diagram showing an overall configuration of a content supply system.

FIG. 24 is a block diagram showing an overall configuration of a content supply system ex100 for realizing content delivery service. The area for providing communication service is divided into cells of desired size, and cell sites ex107~ex110, which are fixed wireless stations, are placed in respective cells.

This content supply system ex100 is connected to apparatuses such as a computer ex111, a Personal Digital Assistant (PDA) ex112, a camera ex113, a cell phone ex114 and a cell phone with a camera ex115 via, for example, Internet ex101, an Internet service provider ex102, a telephone network ex104, as well as the cell sites ex107~ex110.

However, the content supply system ex100 is not limited to the configuration shown in FIG. 24 and may be connected to a combination of any of them. Also, each apparatus may be connected directly to the telephone network ex104, not through the cell sites ex107~ex110.

The camera ex113 is an apparatus capable of shooting video such as a digital video camera. The cell phone ex114 may be a cell phone of any of the following system: a Personal Digital Communications (PDC) system, a Code Division Multiple Access (CDMA) system, a Wideband-Code Division Multiple Access (W-CDMA) system or a Global System for Mobile Communications (GSM) system, a Personal Handyphone System (PHS), or the like.

A streaming server ex103 is connected to the camera ex113 via the telephone network ex104 and also the cell site ex109, which realizes a live distribution or the like using the camera ex113 based on the coded data transmitted from the user. Either of the camera ex113, the server which transmits the data and the like may code the data. The moving picture data shot by a camera ex116 may be transmitted to the streaming server ex103 via the computer ex111. In this case, either the camera ex116 or the computer ex111 may code the moving picture data. An LSI ex117 included in the computer ex111 and the camera ex116 performs the coding processing. Software for coding and decoding a moving picture may be integrated into any type of storage medium (such as a CD-ROM, a flexible disk and a hard disk) that is a storage medium which is readable by the computer ex111 or the like. Furthermore, a cell phone with a camera ex115 may transmit the moving picture data. This moving picture data is the data coded by the LSI included in the cell phone ex115.

The content supply system ex100 codes contents (such as a music live video) shot by a user using the camera ex113, the camera ex116 or the like in the same way as shown in the above-mentioned embodiment and transmits them to the streaming server ex103, while the streaming server ex103 makes stream delivery of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting.

When each apparatus in this system performs coding or decoding, the moving picture coding apparatus or the moving picture decoding apparatus shown in the above-mentioned embodiment can be used.

A cell phone will be explained as an example of such apparatus.

Figure 25:
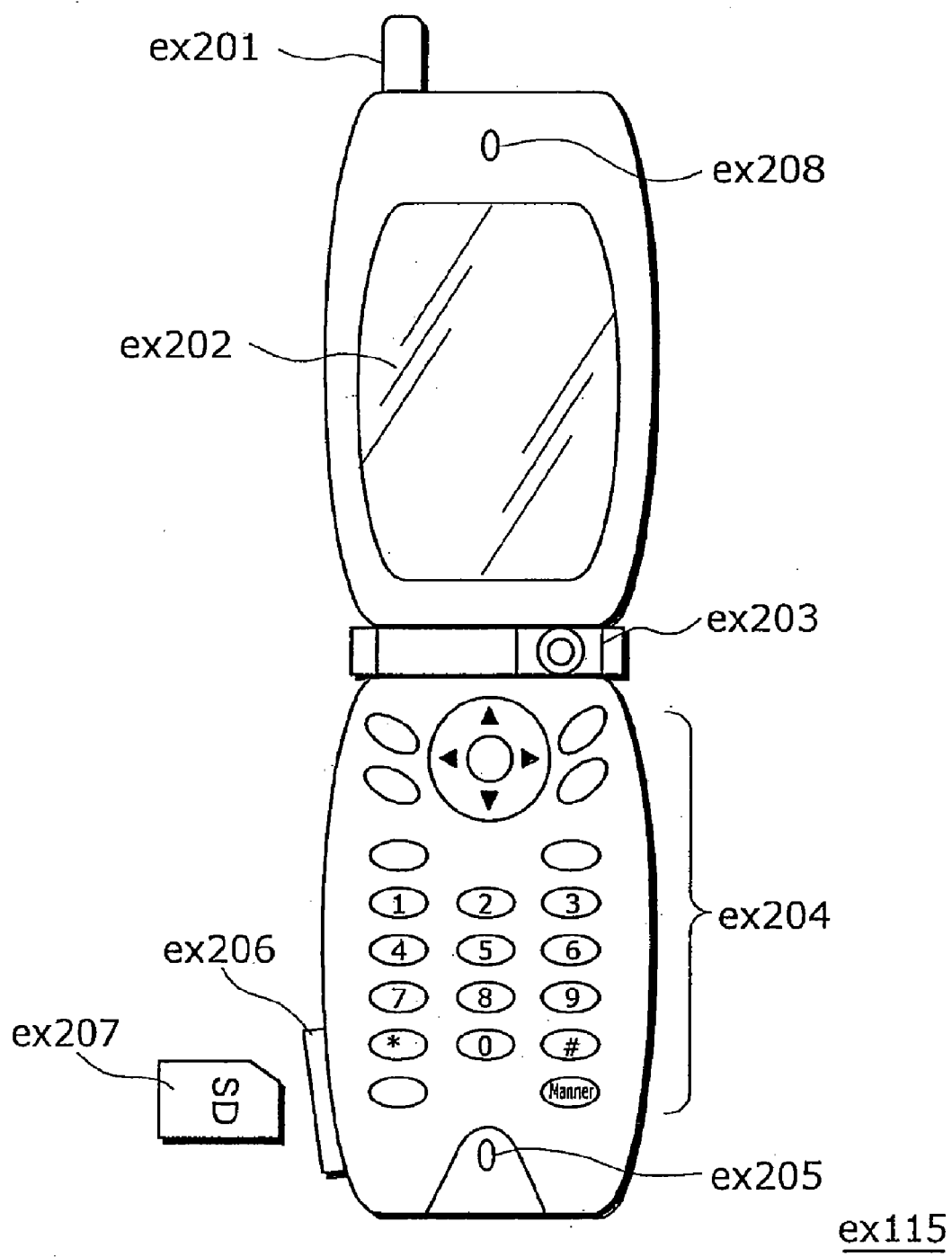
FIG. 25 shows a concrete example of a cell phone that uses the picture coding and decoding methods.

FIG. 25 is a diagram showing the cell phone ex115 using the moving picture coding and decoding methods explained in the above-mentioned embodiment. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, a voice output unit ex208 such as a speaker for outputting voice, a voice input unit ex205 such as a microphone for inputting voice, a storage medium ex207 for recording coded or decoded data such as data of moving or still pictures shot by the camera, data of received e-mails and that of moving or still pictures, and a slot unit ex206 for attaching the storage medium ex207 to the cell phone ex115. The storage medium ex207 stores in itself a flash memory element, a kind of Electrically Erasable and Programmable Read Only Memory (EEPROM) that is a nonvolatile memory electrically erasable from and rewritable to a plastic case such as an SD card.

Next, the cell phone ex115 will be explained with reference to FIG. 26. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, a Liquid Crystal Display (LCD) control unit ex302, a picture decoding unit ex309, a multiplexing/demultiplexing unit ex308, a read/write unit ex307, a modem circuit unit ex306 and a voice processing unit ex305 via a synchronous bus ex313.

When a call-end key or a power key is turned ON by a user's operation, the power supply circuit unit ex310 supplies the respective units with power from a battery pack so as to activate the digital cell phone with a camera ex115 as a ready state.

In the cell phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing for the digital voice data, and the communication circuit unit ex301 performs digital-to-analog conversion and frequency conversion for the data, so as to transmit it via the antenna ex201. Also, in the cell phone ex115, the communication circuit unit ex301 amplifies the data received by the antenna ex201 in conversation mode and performs frequency conversion and the analog-to-digital conversion to the data, the modem circuit unit ex306 perform's inverse spread spectrum processing of the data, and the voice processing unit ex305 converts it into analog voice data so as to output it via the voice output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs the digital-to-analog conversion and the frequency conversion for the text data, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture coding unit ex312, which includes the moving picture coding apparatus as described for the present invention, compresses and codes the picture data supplied from the camera unit ex203 using the coding method employed by the moving picture coding apparatus as shown in the embodiment mentioned above so as to transform it into coded image data, and sends it out to the multiplexing/demultiplexing unit ex308. At this time, the cell phone ex115 sends out the voice received by the voice input unit ex205 during the shooting with the camera unit ex203 to the multiplexing/demultiplexing unit ex308 as digital voice data via the voice processing unit ex305.

The multiplexing/demultiplexing unit ex308 multiplexes the coded image data supplied from the picture coding unit ex312 and the voice data supplied from the voice processing unit ex305, using a predetermined method, then the modem circuit unit ex306 performs spread spectrum processing of the multiplexed data obtained as a result of the multiplexing, and lastly the communication circuit unit ex301 performs digital-to-analog conversion and frequency transform of the data for the transmission via the antenna ex201.

As for receiving data of a moving picture file which is linked to a Web page or the like in data communication mode, the modem circuit unit ex306 performs inverse spread spectrum processing for the data received from the cell site ex110 via the antenna ex201, and sends out the multiplexed data obtained as a result of the inverse spread spectrum processing.

In order to decode the multiplexed data received via the antenna ex201, the multiplexing/demultiplexing unit ex308 demultiplexes the multiplexed data into a coded stream of image data and that of voice data, and supplies the coded image data to the picture decoding unit ex309 and the voice data to the voice processing unit ex305, respectively via the synchronous bus ex313.

Next, the picture decoding unit ex309, including the moving picture decoding apparatus as described in the present invention, decodes the coded stream of the image data using the decoding method corresponding to the coding method as shown in the above-mentioned embodiment to generate reproduced moving picture data, and supplies this data to the display unit ex202 via the LCD control unit ex302, and thus the image data included in the moving picture file linked to a Web page, for instance, is displayed. At the same time, the voice processing unit ex305 converts the voice data into analog voice data, and supplies this data to the voice output unit ex208, and thus the voice data included in the moving picture file linked to a Web page, for instance, is reproduced.

Figure 27:
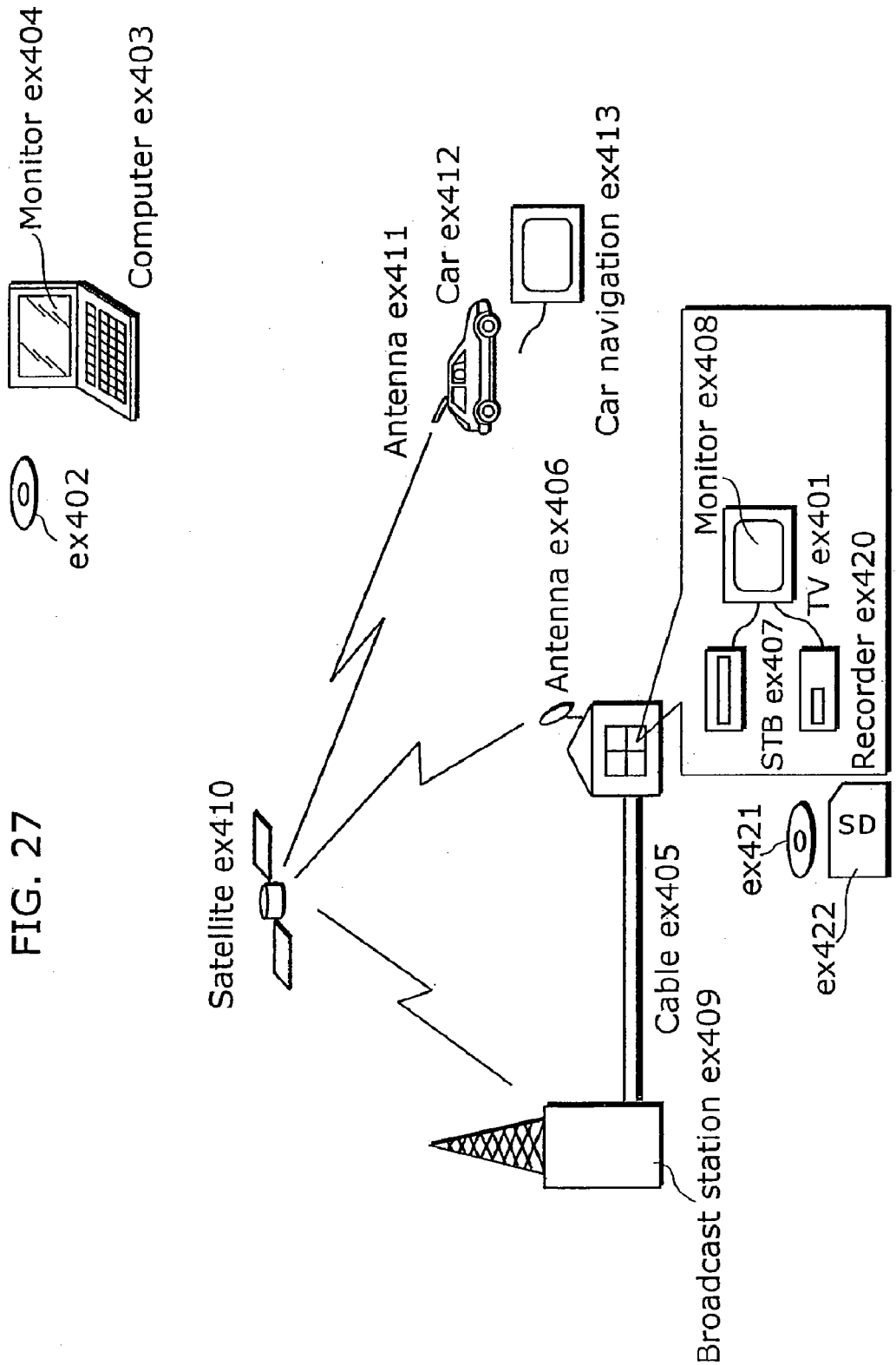
FIG. 27 shows an example of a digital broadcasting system.

The present invention is not limited to the above-mentioned system since ground-based or satellite digital broadcasting has been in the news lately and at least either the moving picture coding apparatus or the moving picture decoding apparatus described in the above-mentioned embodiment can be incorporated into a digital broadcasting system as shown in FIG. 27. More specifically, a coded stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a Set Top Box (STB) ex407 decodes a coded bitstream for reproduction. The moving picture decoding apparatus as shown in the above-mentioned embodiment can be implemented in the reproducing apparatus ex403 for reading out and decoding the coded stream recorded on a storage medium ex402 such as a CD and a DVD. In this case, the reproduced moving picture signals are displayed on a monitor ex404. It is also conceivable to implement the moving picture decoding apparatus in the STB ex407 connected to a cable ex405 for a cable television or the antenna ex406 for satellite and/or ground-based broadcasting so as to reproduce them on a monitor ex408 of the television ex401. The moving picture decoding apparatus may be incorporated into the television, not in the Set Top Box. Also, a car ex412 having an antenna ex411 can receive signals from the satellite ex410 or the cell site ex107 for replaying a moving picture on a display device such as a car navigation system ex413 set in the car ex412.

Furthermore, the moving picture coding apparatus as shown in the above-mentioned embodiment can code picture signals and record them on the storage medium. As a concrete example, a recorder ex420 such as a DVD recorder for recording picture signals on a DVD disk ex421, a disk recorder for recording them on a hard disk can be cited. They can be recorded on an SD card ex422. When the recorder ex420 includes the moving picture decoding apparatus as shown in the above-mentioned embodiment, the picture signals recorded on the DVD disk ex421 or the SD card ex422 can be reproduced for display on the monitor ex408.

Figure 26:
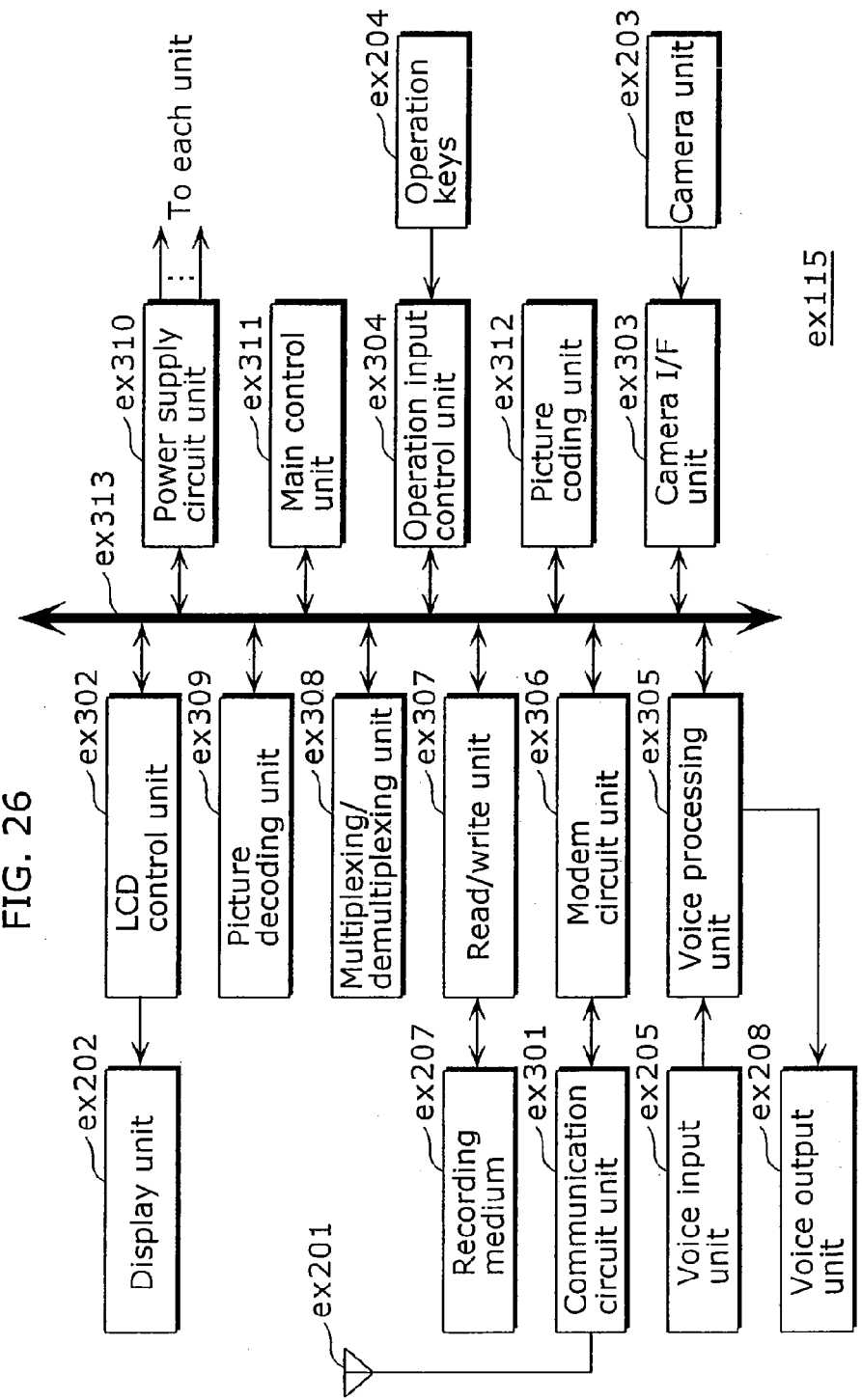
FIG. 26 is a block diagram showing the cell phone.

For the structure of the car navigation system ex413, the structure without the camera unit ex203, the camera interface unit ex303 and the picture coding unit ex312, out of the components shown in FIG. 26, is conceivable. The same applies for the computer ex111, the television (receiver) ex401 and others.

In addition, three types of implementations can be conceived for a terminal such as the cell phone ex114: a sending/receiving terminal implemented with both an encoder and a decoder, a sending terminal implemented with an encoder only, and a receiving terminal implemented with a decoder only.

Note that each function block in the block diagram shown in FIGS. 4, 16A, 16B, 17A, 17B, 18A, 18B and 22 can be realized as an LSI that is an integrated circuit apparatus. Such LSI may be incorporated in one or plural chip form (e.g. function blocks other than a memory may be incorporated into a single chip). Here, LSI is taken as an example, however, it may be called "IC", "system LSI", "super LSI" and "ultra LSI" depending on the integration degree.

The method for incorporation into an integrated circuit is not limited to the LSI, and it may be realized with a private line or a general processor. After manufacturing of LSI, a Field Programmable Gate Array (FPGA) that is programmable, or a reconfigurable processor that can reconfigure the connection and settings for the circuit cell in the LSI, may be utilized.

Furthermore, along with the arrival of technique for incorporation into an integrated circuit, which replaces the LSI owing to a progress in semiconductor technology or another technique that has deviated from it, integration of the function blocks may be carried out using the newly-arrived technology. Application of bio-technology may be cited as one of the examples.

Among the function blocks, only a unit for storing data may be constructed separately without being incorporated in a chip form, as the storage medium 115 described in the present embodiment.

Note that the main part in the function blocks shown in FIGS. 4 and 22 or in the flowcharts shown in FIGS. 19 to 21 can be realized by a processor or a program.

As stated above, it is possible to employ the picture coding method and the picture decoding method presented in the above embodiment in any one of the above-described devices and systems. Accordingly, it becomes possible to achieve the effects described in the aforementioned embodiment.

Second Embodiment

The following describes a second embodiment of the present invention.

<Integer-Based Division-Free Quantization Scheme>

To reduce computational complexity, quantization with q-matrix is desirable to employ multiplication and shift operations only. In other words, the computationally intensive division operations shall be avoided in practice. The proposed method for efficient integer-based division-free non-uniform quantization is applicable in general to any size of block transform and quantization in video coding systems.

In FIGS. 16A and 16B, the operations for quantization and de-quantization of a transform coefficient are illustrated, where only multiplication and shift operations are used. For a given QP, the values of S1 and S2 are fixed for all coefficients, while the values of Q1 and Q2 depend on QP value and the coefficient position (See reference to Ref. 1: Joint Video Team (JVT) of ISO/IEC MPEG & ITU-T VCEG, "Draft of ITU-T Recommendation and Final Draft International Standard of Joint Video Specification (ITU-T Rec. H.264|ISO/IEC 14496-10 AVC)", JVT-G050r1.doc, Geneva, Switzerland, May 2003). Note that this is not a weighted quantization mechanism, but merely a normalization issue because the rows of integer transform are orthogonal but do not have the same norm in video coding standard (See Ref. 1).

The integration of q-matrix into the division-free quantization and de-quantization can be first thought of introducing another pair of multiplication and shift in both processes. These are illustrated in FIGS. 17A and 17B. Note that the values of Qa and Qb are dependent on the specified q-matrix entry as well as the specified value of Sa.

In order to reduce computational complexity, division operations can be approximated with use of multiplication and shift operations only. For a specified q-matrix entry Mq and a given (or agreed upon by both encoder and decoder) value of Sa, the value of integer Qa is defined as $(1<<(Sa+Bn))/Mq$. Correspondingly, the value of integer Qb is defined as $Mq<<(Sa-Bn)$. For instance, Bn can be set to 4. It is obvious that, in this case, quantization using a q-matrix with all entries equal to 16 will be same as uniform quantization in video coding standard (See Ref. 1). Note that Sa>Bn and usually Sa>=8. This design is to maintain a certain level of precision in integer calculation, because both Qa and Qb are integers. Considering this design of quantization with q-matrix, it can be verified that all operations and memory access can be computed in 16 bits. Note that intermediate results are allowed to exceed 16-bit if the data is scaled/shifted before storage. A larger value of Sa permits better precision in integer calculation for quantization, however, the value shall be constrained concerning the dynamic range of intermediate results in regard of hardware design.

<Single Multiplication for Both De-Quantization and Normalization Inverse Transform>

Based on FIGS. 17A and 17B, it is straightforward to combine the multiplication and shift operations accordingly, and therefore reduce the computational complexity. FIGS. 18A and 18B show a further level of integration for quantization with q-matrix. To be specific, integer Q1$a$ is defined as $Q1*(1<<(Sa+Bn))/Mq$ and integer Q2$a$ is equal to $Q2*Mq<<(Sa-Bn)$. Since Q1 and Q2 are obtained from lookup tables, the integration of q-matrix basically leads to updated lookup tables in implementation.

The tables can be easily changed at the initialization stage based on specified q-matrices. Note that the value of integer S2 is defined as QP/6 and it is always less than 8 since QP must be in the range of [0,51] in video coding standard (See Ref. 1). Importantly, the proposed integration helps make the values of Q1$a$ distinguishable for different values of each q-matrix entry (which is typically [1,255], as an example). This is a desirable property from the viewpoint of encoder design since it allows flexibility of finer tuning in terms of quantization.

<Examples of New Lookup Tables Derived Based on q-Matrix>

We have the following formulae in a general form for

Quantization:

$C_{ij}=\text{sign}(x_{ij})*(\text{abs}(x_{ij})*Q_q(QP \% 6,i,j)+(1<<n)*f)>>n$

De-quantization:

$y_{ij}=\text{sign}(c_{ij})*((\text{abs}(c_{ij})*Q_d(QP \% 6,i,j))>>m)$

Here, $x_{ij}$, $C_{ij}$, $y_{ij}$ denote original, quantized, and de-quantized coefficients, respectively. $Q_q$ and $Q_d$ are the matrices used in quantization and de-quantization, respectively. Considering the normalization of integer transform, $Q_q$ and $Q_d$ are different. Note that $Q_q$ and $Q_d$ will be flat matrices in the case of uniform quantization. sign(x) is equal to one if x is positive, zero if x=0, or -1 if x is negative. abs(x) is the absolute value of x. The values of m and n depend on QP, the block transform size, and the value of Sa. The value of f usually depends on block coding type; for example, it is ⅜ for intra-coded and ⅙ for inter-coded blocks, respectively.

<New Lookup Tables/Matrices in Association with 8×8 q-Matrix>

Figures 28, 29, 30, 31:
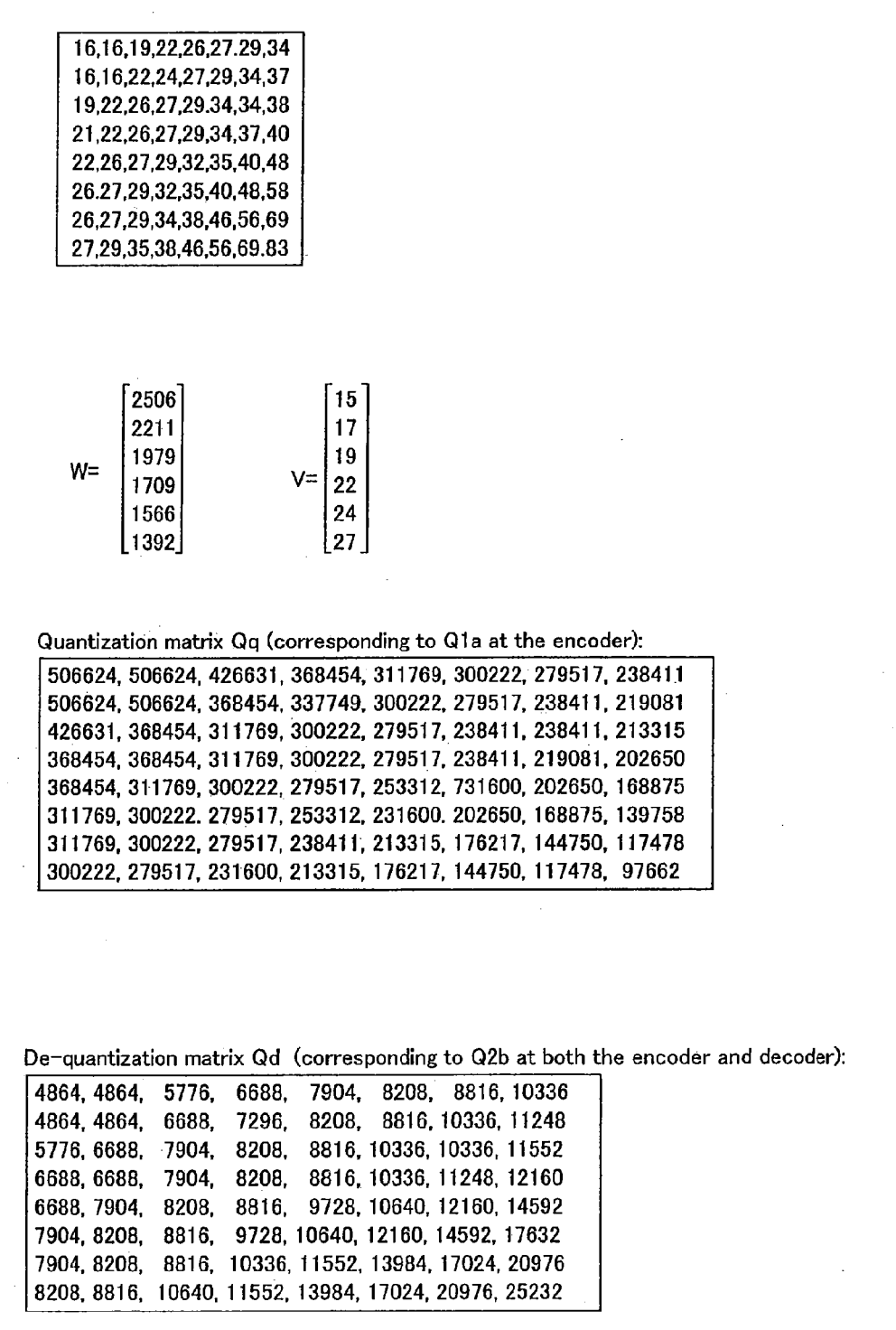

Consider the case of Bn=4 and Sa=8, and the matrices $Q_q$ and $Q_d$ are derived as in FIGS. 30 and 31. For an 8×8 integer transform whose rows are orthogonal and have the same norm, the derivation of lookup table of using q-matrix is straightforward. Assume the 8×8 q-matrix shown in FIG. 28.

Based on the 8×8 integer transform, one has quantization and de-quantization scaling factor tables as shown in FIG. 29, respectively.

In the case of QP=20, the scaling factors (used as multipliers) shall be 1979 for the quantization and 19 for the de-quantization, respectively. Note that these values are same for all the transform coefficients in the case of uniform quantization. When using q-matrix, the scaling factor is essentially changed to a matrix as shown in FIGS. 30 and 31, respectively. The matrices can be initialized for each scaling factor when a q-matrix is specified.

<New Lookup Tables/Matrices in Association with 4×4 q-Matrix>

Consider the case of Bn=4 and Sa=8, and the matrices $Q_q$ and $Q_d$ are derived as shown in FIGS. 34 and 35. For the 4×4 integer transform (See reference to Ref 1) whose rows are orthogonal but have different norms, the derivation of lookup tables of using q-matrix needs to take into account the positions of coefficients in the matrix. Assume the 4×4 q-matrix shown in FIG. 32. The tables of quantization and de-quantization scaling factors (considering the normalization of integer transform) are specified as shown in FIG. 33.

In the case of QP=20, the matrix of scaling factors (used as multipliers) for the quantization and de-quantization shall be as shown in FIGS. 34 and 35, respectively.

These matrices can be initialized for each row of the matrices w and v that are listed in FIG. 33 when a 4×4 q-matrix is specified.

<Separate Treatment of DC Block Quantization>

The proposed quantization with q-matrix is not applied to the second level transform, i.e., transform of the DC components for both luma and chroma, where Hadamard transform is employed. Here is some reasoning. At the encoder, quantization follows transform, while at the decoder de-quantization follows, instead of preceding, inverse transform. This is to maintain possible dynamic range (precision in integer calculation) during inverse transform. As a result, quantization and de-quantization are actually in different domain. It is not a problem for uniform quantization, but will cause misalignment of scaling factors for the coefficients in using weighted q-matrix. In addition, Hadamard transform itself does not necessarily hold the same properties of DCT (or an approximated integer transform) as in the first level. Weighted quantization in the Hadamard transform domain might not make as much sense.

This innovation extends a uniform quantization scheme into weighted quantization scheme using q-matrix while maintaining integer operations and keeping complexity to its minimum. As an important example, this solution allows integration of quantization matrix scheme into the current video coding system (See reference to Ref. 1) implementation with negligible complexity increase and minimum syntax changes.

Third Embodiment

The following describes a third embodiment of the present invention.

In the video coding systems, a set of quantization matrices are defined by default so that decoders implement the quantization schemes and the matrices. They will be used for decoding when encoded bit-streams use the quantization weighting schemes. User can define their own quantization matrices and transmit them to decoder. This innovation will specify how the quantization matrices are transmitted to decoders.

This innovation also defines the choices of transforms in various coding mode selections.

In the quantization weighting scheme, we described the following major features:

1. Specification of the quantization weighting scheme using completely integer based, division free, requiring only 16-bit memory operation at decoder, which introduces no complexity increase compared to uniform quantization scheme.

2. The non-uniform quantization scheme proposed is based on 8×8 transform on luma since we consider this is the transform that preserves better picture textures, one of the most important content elements that affect the subjective impression of high quality pictures.

The non-uniform quantization weightings are applied to residuals in both intra-prediction and inter-prediction. This innovation provided a set of new coding tools and extended a uniform quantization scheme into weighted quantization scheme using q-matrix while maintaining integer operations and keeping complexity to its minimum. This makes video coding especially efficient in high quality and high bit-rate coding applications.

Professional Extension Profiles (Fidelity Range Profiles) of AVC is aimed at coding of high-resolution pictures, including HD pictures. As such, high visual fidelity is appreciated greatly in HD picture presentation. When an AVC Professional Extension Profiles is used, it is naturally desirable to allow the superior coding efficiency of AVC to directly benefit visual quality to the greatest extent. With the aim to improve HD subjective quality, we propose here a quantization weighting scheme that enables non-uniform quantization weightings to block transform coefficients. We consider non-uniform quantization tools to be critical for the following reasons:

1. Improving visual fidelity of decoded pictures

2. Non-uniform quantization makes it possible for quantization adjustment to be done in proportion to human vision sensitivity, which improves coding efficiency in picture fidelity.

3. Providing flexible choices in controlling end picture quality, strongly required by high quality content creation industry.

The quantization weighting scheme proposed here includes the following major features:

1. Specification of the quantization weighting scheme using completely integer based, division free, requiring only 16-bit memory operation at decoder, which introduces no complexity increase compared to uniform quantization scheme.

2. The non-uniform quantization scheme proposed is based on 8×8 transform on luma since we consider this is the transform that preserves better picture textures, one of the most important content elements that affect the subjective impression of high quality pictures.

3. The non-uniform quantization weightings are applied to residuals in both intra-prediction and inter-prediction.

Our simulation and viewing in various HD display devices show subjective quality improvement in all video sequences and significant improvement in many of the test videos including some of the JVT sequences and film content we obtained from movie studios.

<Scope of the Proposal on 8×8 Transform and Quantization Weighting Matrix>

We would like to propose inclusion of 8×8 transform on the basis that many of previous JVT contributions presented to JVT has shown good coding efficiency. More importantly, it has been shown that subjective quality from the use of 8×8 transform provides better preservation of picture textures. Since we have a well-established 8×8 transform (See reference to Ref 2: S. Gordon, D. Marpe, T. Wiegand, "Simplified use of 8×8 Transform," ISO/IEC JTC1/SC29/WG11 and ITU-T Q6/SG16, Document JVT-J029, December 2003 . . . ) that many of previous contributions and previous AVC Committee Draft were based upon, we chose to use that transform in our proposal. However, we don't expect major difference in results, should other choices of 8×8 integer transform matrices be used.

<8×8 Luma Intra-Prediction>

A new macroblock mode mb_type I_8×8 is proposed here for luma 8×8 intra-prediction, in addition to existing mode Intra 16×16, Intra 4×4. There are nine intra 8×8 prediction modes. They are specified in Ref. 2. Low-pass filtering is applied to reference pels in order to improve prediction effectiveness. The filtering is also specified in the ABT 8×8 intra-prediction part in Ref. 2.

<Chroma Intra-Prediction>

Depending on the chroma sampling format, different quantization weighting should be used. For 4:2:0 and 4:2:2 formats, 4×4 quantization weightings are used, where the quantization scheme is defined below. For 4:4:4 format, the chroma samples are applied with the same transform and quantization scheme.

<8×8 Inter-Prediction>

8×8 transform is used for all P and B macroblock types of 16×16, 16×8 and 8×16. Additionally, 8×8 transform is used for any 8×8 sub macroblock with sub_mb_type equal to P_L0_8×8 for P slices, or B_Direct_8×8, B_L0_8×8, B_L1_8×8, or B_Bi_8×8 for B slices.

<Syntax Elements for Quantization Weighting Matrix>

The additional syntax elements for quantization weighting matrix includes the definition of user-defined weighting matrices at the beginning of the bit stream. Referencing of quantization weighting matrices by matrix IDs in Picture Parameter Set.

<Quantization Weighting Matrix>

The quantization weighting matrix is applied to the quantization step right before the inverse transform in the decoder. The weighting at each of the coefficient index can be different for providing uniform quantization. The weightings are additional to QP defined in the syntax, so that the quantization applied is actually combination of the quantization weights and QP (FIG. 36). The weighting matrix can decrease and increase quantization amount relative to QP.

In AVC specification, de-quantization is performed by a multiplication of de-quantization scaling and then a shift, where the de-quantization scaling is computed by QP mod 6. There is one integer multiplication per de-quantization operation. When quantization weighting matrix is used, the quantization is similarly defined.

In a quantization weighting matrix, in order to maintain the range of weights to go from greater than 1 to weights less than one. The values of the quantization weighting matrix are actually the rounded integer value of the actual weighting value times 16. For example, a quantization weight values 1.2 corresponds to a quantization weighting matrix value of 19. An example of the quantization weighting matrix is shown in FIG. 37.

<Quantization Weighting for 8×8 Luma>

For 8×8 luma, $d_{ij}$ denotes the quantized transform coefficients. W(i,j) denotes the quantization weighting matrix. Then we have the de-quantization operations as shown in FIG. 38.

<Quantization Weighting for 4×4 Block Transform>

For 4:2:0 and 4:2:2 chroma format, chroma is transformed into 4×4 DCT domain. A 4×4 quantization weighting matrix is applied to AC coefficients only. For each of the 8×8 chroma blocks, 2×2 DC block is formed, and transform is further applied where the coefficients are uniformly quantized. This is the same as the current specifications.

The derivation process of chroma QP in Ref. 3: ITU-T Recommendation H.264 and ISO/IEC International Standard 14496-10 AVC, Document JVT-J010d7, October 2003, remains the same here. However, de-quantization for the 2×2 chroma DC is defined as follows, $$dcC_{ij}=(f_{ij}*M(QP_C\%6,0,0)<<QP_C/6-5, \text{ for } QP_C/6\geq 5 \qquad (5)$$

$$dcC_{ij}=(f_{ij}*M(QP_C\%6,0,0)+1<<(4-QP_C/6))>>5-QP_C/6, \text{ for } QP_C/6<5 \qquad (6)$$

where $$M(QP_C\%6,0,0)=W(0,0)=W(0,0)*LevelScale(QP_C\%6,0,0) \qquad (7)$$

The weighting matrix is only applied to the AC part of the quantized coefficients. The de-quantization is defined similarly as Equation (1) and (2) in FIG. 38, except that the LevelScale function is defined as in 8.5.8 in Ref. 3 that is shown in FIGS. 39 and 40.

The rest of decoding process is identical to the specification in Ref. 3. In the 4:4:4 chroma sampling case, each of the 8×8 chroma block is transformed and quantized in the same way as luma.

In field coding mode, both field macroblock in the macroblock pair uses the same set of quantization matrices. In the case of B_Direct_8×8 mode in field coding mode, when motion search block mode is smaller than 8×8 block, we would also like to propose to allow the use of 4×4 quantization weighting for the residuals of 4×4 transform blocks.

In applying quantization weighting scheme, it must be noted that special care must be taken in designing quantization weighting matrix in combination with QP. It should be assured that the quantization weighting does not expand the bit size of any coefficients. It is most desired that the certain balance among matrix coefficients be maintained although it is encoder's responsibility.

<Derivation of De-Quantization Scaling Table Based on Quantization Weighting Matrix>

When a user-defined quantization weighting matrix is sent to a decoder, the decoder needs to build de-quantization scaling tables based on the quantization weightings and QP % 6. Each QP % 6 corresponds to one scaling table. The table can be computed by multiplying each entry of the uniform de-quantization and scaling table in the current AVC specification with quantization weighting matrix. An example of this is in the derivation of the de-quantization table, shown in FIG. 41, based on the transform proposed in Ref. 2. If we have a quantization matrix with the values shown in FIG. 41 followed by additional 4 shifts to left.

The de-quantization coefficient table, when QP % 6=0, will be as shown in FIG. 42.

<Complexity>

There is no additional complexity for introducing one quantization matrix comparing to the current uniform quantization, once the quantization scaling table M(QP % 6,0,0) is generated based on quantization weighting matrix and QP/6. There are 64 integer multiplications per 8×8 quantization and 16 integer multiplication per 4×4 quantization matrix to generate the scaling table, M(QP % 6,0,0). There are a maximum of total storage of 768 bytes (64*2*6) per 8×8 quantization matrix and 192 bytes per 4×4 quantization matrix.

<Bitstream Syntax for Quantization Weighting Matrix>

Encoder should be able to choose whether quantization weighting is to be used. To allow that, it is necessary to set use_weighting_matrix flag in Sequence Parameter Set that quantization weighting matrix is used.

Like in MPEG-2, quantization weighting matrices can be defined by users in addition to default set of matrices. User-supplied quantization weighting matrices can be loaded into decoder with a pic_parameter_set. The loaded quantization weighting matrices can be referenced by other pic_parameter_set at later time. The loaded matrices shall be used to generate de-quantization tables that will be kept in decoders. The loaded matrices are numbered by IDs. Weighting matrices can be kept in memory within the current picture (available for slices in current frame) or be kept for long term. Those that will be kept in memory only within the current picture are local weighting matrices. They can be differentiated from the long-term matrices by weighting matrix ID=0-1. Weighting matrices of sizes 4×4 and 8×8 can have the same IDs.

A set of default quantization weighting matrices can be made available for cases that there are no user-defined weighting matrices. The set of the default quantization weighting matrices is known to decoders. All the quantization scaling tables are pre-defined for the set of default weighting matrices, therefore no pre-computing is required. The set of default quantization weighting matrices include two for luma (intra-prediction and inter-prediction) and two for chroma (4×4).

The weighting matrices can be referenced later with identification numbers. We propose that there is a maximum of one quantization matrix for luma per inter and per intra prediction mode for each Picture Parameter Set. Similarly, there is a maximum of one 4×4 quantization matrix per inter and per intra prediction mode.

<Syntax>

The following descriptions are proposed pic_parameter_set_rbsp with inserted entries for defining quantization matrices for 8×8 or 4×4 inter-prediction, intra-prediction macroblocks.

```
pic_parameter_set_rbsp( ){
    ...
    new_quantization_matrices_defined
    if(new_quantization_matrices_defined)
        def_quant_weighting_matrix
    ...
    intra_quant_mat8_update
    if(intra_quant_mat8_update)
        quant_mat8_id
    inter_quant_mat8_update
    if(inter_quant_mat8_update)
        quant_mat8_id
    intra_quant_mat4_update
    if(intra_quant_mat4_update)
        quant_mat4_id
    inter_quant_mat4_update
```

-continued

```
If(inter_quant_mat4_update)
    quant_mat4_id
    ...
}
def_quant_weighting_matrix( ){
    load_quant_mat8
    if(load_quant_mat8){
        num_quant_mat8
        for(k=0;k<num_quant_mat8;k++){
            quant_mat8_id
                for(i=0;i<8;++i)
                    for(j=0;j<8;++j)
                        quant_mat8[i][j]
        }
    }
    load_quant_mat4
    if(load_quant_mat4){
        num_quant_mat4
        for(k=0;k<num_quant_mat4;k++){
            quant_mat4_id
                for(i=0;i<4;++i)
                    for(j=0;j<4;++j)
                        quant_mat4[i][j]
        }
    }
}
```

Fourth Embodiment

The following describes a fourth embodiment of the present invention.

<Scaling and Transformation Process for Luma DC Transform Coefficients for Intra_16×16 Macroblock Type>

Note that the following formulae may be used for de-quantization scaling function operation.

If $QP'_Y$ is greater than or equal to 36, the scaled result shall be derived as $$dcY_{ij}=(f_{ij}*\text{LevelScale}_{4\times 4L,Intra}(QP'_Y \% 6,0,0))<<(QP'_Y/6-6), \text{ with } i,j=0\ldots 3$$

Otherwise ($QP'_Y$ is less than 36), the scaled result shall be derived as $$dcY_{ij}=(f_{ij}*\text{LevelScale}_{4\times 4C,Intra}(QP'_Y \% 6,0,0)+2^{5-QP'_Y/6})>>(6-QP'_Y/6), \text{ with } i,j=0\ldots 3$$

<Scaling and Transformation Process for Chroma DC Transform Coefficients for 4:2:0 Chroma Format>

Note that the following formulae may be used for de-quantization scaling function operation.

If $QP'_C$ is greater than or equal to 30, the scaled result shall be derived as $$dcC_{ij}=(f_{ij}*\text{LevelScale}_{4\times 4C,Intra}(QP'_C \% 6,0,0)<<(QP'_C/6-5), \text{ with } i,j=0,1$$

Otherwise ($QP'_C$ is less than 30), the scaled result shall be derived as $$dcC_{ij}=((f_{ij}*\text{LevelScale}_{4\times 4C,Intra}(QP'_C \% 6,0,0)+2^{(4-QP'C/6)})>>(5-QP'_C/6), \text{ with } i,j=0,1$$

<Scaling and Transformation Process for Chroma DC Transform Coefficients for 4:2:2 Chroma Format>

Inputs to this process are transform coefficient level values for chroma DC transform coefficients of one chroma component of the macroblock as a 2×4 array c with elements $C_{ij}$, where i and j form a two-diemnsional frequency index.

Outputs of this process are 8 scaled DC values as a 2×4 array dcC with elements $dcC_{ij}$.

The inverse transform for the 2×4 chroma DC transform coefficients is specified by:

A bitstream shall not contain data that results in any element fij of f that exceeds the range of integer values from $-2^{15}$ to $2^{15}-1$, inclusive.

The variable $QP'_{C,DC}=QP'_C+3$

After the inverse transform, scaling is performed as follows.

If $QP'_{C,DC}$ is greater than or equal to 36, the scaled result shall be derived as $$dcC_{ij}=(f*\text{LevelScale}_{4\times 4C,Intra}(QP'_{C,DC} \% 6,0,0,0))<<(QP'_{C,DC}/6-6), \text{ with } i=0\ldots 3, j=0,1$$

Otherwise ($QP'_{C,DC}$ is less than 36), the scaled result shall be derived as $$dcC_{ij}=(f*\text{LevelScale}_{4\times 4C,Intra}(QP'_{C,DC} \% 6,0,0,0))+2^{(5-QP'C,DC/6)})>>(6-QP'_{C,DC}/6), \text{ with } i=0\ldots 3, j=0,1$$

A bitstream shall not contain data that results in any element $dcC_{ij}$ of dcC that exceeds the range of integer values from $-2^{15}$ to $2^{15}-1$, inclusive.

<Scaling and Transformation Process for Chroma DC Transform Coefficients for 4:4:4 Chroma Format>

Inputs to this process are transform coefficient level values for chroma DC transform coefficients of one choroma component of the macroblock as a 4×4 array c with elements $c_{ij}$, where i and f form a two-dimensional frequency index.

Outputs of this process are 16 scaled DC values as a 4×4 array dcC with elements $dcC_{ij}$.

The inverse transform for the 4×4 chroma DC transform coefficients is specified as in FIG. 43.

A bitstream shall not contain data that results in any element fij of f that exceeds the range of integer values from $-2^{15}$ to $2^{15}-1$, inclusive.

After the inverse transform, scaling is performed as follows.

If $QP'_C$ is greater than or equal to 36, the scaled result shall be derived as $$dcC_{ij}=(f*\text{LevelScale}_{4\times 4C,Intra}(QP'_C \% 6,0,0,0))<<(QP'_C/6-6), \text{ with } i=0\ldots 3, j=0,1$$

Otherwise ($QP'_C$ is less than 36), the scaled result shall be derived as $$dcC_{ij}=(f*\text{LevelScale}_{4\times 4C,Intra}(QP'_C \% 6,0,0,0)+2^{(5-QP'C,DC/6)})>>(6-QP'_C/6), \text{ with } i=0\ldots 3, j=0,1$$

A bitstream shall not contain data that results in any element $dcC_{ij}$ of dcC that exceeds the range of integer values from $-2^{15}$ to $2^{15}-1$, inclusive.

<Scaling and Transformation Process for Residual 8×8 Blocks>

Input to this process is an 8×8 array c with elements $c_{ij}$, which is an array relating to an 8×8 residual block of the luma component.

Outputs of this process are residual sample values as 8×8 array r with elements $r_{ij}$.

The function LevelScale64 is derived as follows:

if macroblock prediction mode is equal to an intra prediction mode and the input is a 8×8 luma residual LevelScale 64( )=LevelScale$_{8\times 8, Intra}$( )

if macroblock prediction mode is equal to an inter prediction mode and the input is a 8×8 luma residual block Level Scale64( )=LevelScale$_{8\times 8, Inter}$( )

Scaling of 8×8 block transform coefficient levels $c_{ij}$ proceeds as follows:

if $QP_Y$ is greater than or equal to 36, scaling of 8×8 block transform coefficient levels $c_{ij}$ shall be performed as $d_{ij}=(c_{ij}*\text{LevelScale64}(QP_Y\%6,i,j))<<(QP_Y/6-6)$, with $i,j=0\ldots7$ Otherwise ($QP_Y$ is less than 36), scaling of 8×8 block transform coefficient levels $c_{ij}$ shall be performed as $d_{ij}=(c_{ij}*\text{LevelScale64}(QP_Y\%6,i,j)+2^{(5-QP_{isY}/6)})>>(6-QP_Y/6)$, with $i,j=0\ldots7$ The above formulae reflect the additional right shift needed in order to incorporate scaling factor from q-matrix. Because de-quantization/quantization weighting is defined as $w(i,j)=\text{QuantizationMatrix}(i,j)/16$. After combining QuantizationMatrix(i,j) in LevelScale function, we need to have additional 4-bit right shift to reflect the division by 16.

The transform process shall convert the block of scaled transform coefficients to a block of output samples in a manner mathematically equivalent to the following.

First, each (horizontal) row of scaled transform coefficients is transformed using a one-dimensional inverse transform as follows.

A set of intermediate values $e_{ij}$ is derived by $e_{i0}=d_{i0}+d_{i4}$, with $i=0\ldots7$ $e_{i1}=-d_{i3}+d_{i5}-d_{i7}-(d_{i7}>>1)$, with $i=0\ldots7$ $e_{i2}=d_{i0}-d_{i4}$, with $i=0\ldots7$ $e_{i3}=d_{i1}+d_{i7}-d_{i3}-(d_{i3}>>1)$, with $i=0\ldots7$ $e_{i4}=(d_{i2}>>1)-d_{i6}$, with $i=0\ldots7$ $e_{i5}=-d_{i1}+d_{i7}+d_{i5}+(d_{i5}>>1)$, with $i=0\ldots7$ $e_{i6}=d_{i2}+(d_{i6}>>1)$, with $i=0\ldots7$ $e_{i7}=d_{i3}+d_{i5}+d_{i1}-(d_{i1}>>1)$, with $i=0\ldots7$ A second set of intermediate results $f_{ij}$ is computed from the intermediate values $e_{ij}$ as $f_{i0}=e_{i0}+e_{i6}$, with $i=0\ldots7$ $f_{i1}=e_{i1}+(e_{i7}>>2)$, with $i=0\ldots7$ $f_{i2}=e_{i2}+e_{i4}$, with $i=0\ldots7$ $f_{i3}=e_{i3}+(e_{i5}>>2)$, with $i=0\ldots7$ $f_{i4}=e_{i2}-e_{i4}$, with $i=0\ldots7$ $f_{i5}=(e_{i3}>>2)-e_{i5}$, with $i=0\ldots7$ $f_{i6}=e_{i0}-e_{i6}$, with $i=0\ldots7$ $f_{i7}=e_{i7}-(e_{i1}>>2)$, with $i=0\ldots7$ Then, the transformed result $g_{ij}$ is computed from these intermediate values $f_{ij}$ as $g_{i0}=f_{i0}+f_{i7}$, with $i=0\ldots7$ $g_{i1}=f_{i2}+f_{i5}$, with $i=0\ldots7$ $g_{i2}=f_{i4}+f_{i3}$, with $i=0\ldots7$ $g_{i3}=f_{i6}-f_{i1}$, with $i=0\ldots7$ $g_{i4}=f_{i6}-f_{i1}$, with $i=0\ldots7$ $g_{i5}=f_{i4}-f_{i3}$, with $i=0\ldots7$ $g_{i6}=f_{i2}-f_{i5}$, with $i=0\ldots7$ $g_{i7}=f_{i0}-f_{i7}$, with $i=0\ldots7$ Then, each (vertical) column of the resulting matrix is transformed using the same one-dimensional inverse transform as follows.

A set of intermediate values $h_{ij}$ is computed from the horizontally transformed value $g_{ij}$ as $h_{i0}=g_{i0}+g_{i4}$, with $i=0\ldots7$ $h_{i1}=-g_{i3}+g_{i5}-g_{i7}-(g_{i7}>>1)$, with $i=0\ldots7$ $h_{i2}=g_{i0}-g_{i4}$, with $i=0\ldots7$ $h_{i3}=g_{i1}+g_{i7}-g_{i3}-(g_{i3}>>1)$, with $i=0\ldots7$ $h_{i4}=(g_{i2}>>1)-g_{i6}$, with $i=0\ldots7$ $h_{i5}=-g_{i1}+g_{i7}+g_{i5}+(g_{i5}>>1)$, with $i=0\ldots7$ $h_{i6}=g_{i2}+(g_{i6}>>1)$, with $i=0\ldots7$ $h_{i7}=g_{i3}+g_{i5}+g_{i1}+(g_{i1}>>1)$, with $i=0\ldots7$ A second set of intermediate results $k_{ij}$ is computed from the intermediate values $h_{ij}$ as $k_{i0}=h_{i0}+h_{i6}$, with $i=0\ldots7$ $k_{i1}=h_{i1}+(h_{i7}>>2)$, with $i=0\ldots7$ $k_{i2}=h_{i2}+h_{i4}$, with $i=0\ldots7$ $k_{i3}=h_{i3}+(h_{i5}>>2)$, with $i=0\ldots7$ $k_{i4}=h_{i2}-h_{i4}$, with $i=0\ldots7$ $k_{i5}=(h_{i3}>>2)-h_{i5}$, with $i=0\ldots7$ $k_{i6}=h_{i0}-h_{i6}$, with $i=0\ldots7$ $k_{i7}=h_{i7}-(h_{i1}>>2)$, with $i=0\ldots7$ Then, the transformed result $m_{ij}$ is computed from the intermediate values $k_{ij}$ as $m_{i0}=k_{i0}+k_{i7}$, with $i=0\ldots7$ $m_{i1}=k_{i2}+k_{i5}$, with $i=0\ldots7$ $m_{i2}=k_{i4}+k_{i3}$, with $i=0\ldots7$ $m_{i3}=k_{i6}+k_{i1}$, with $i=0\ldots7$ $m_{i4}=k_{i6}-k_{i1}$, with $i=0\ldots7$ $m_{i5}=k_{i4}-k_{i3}$, with $i=0\ldots7$ $m_{i6}=k_{i2}-k_{i5}$, with $i=0\ldots7$ $m_{i7}=k_{i0}-k_{i7}$, with $i=0\ldots7$ After performing both the one-dimensional horizontal and the one-dimensional vertical inverse transforms to produce an array of transformed samples, the final constructed residual sample values shall be derived as $r_{ij}=(m_{ij}+2^5)>>6$, with $i,j=0\ldots7$ From the invention thus described, it will be obvious that the embodiment of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The present invention is suitable for a coding apparatus for coding or decoding pictures, and also for a web server that distributes moving pictures, a network terminal that receives the moving pictures, and even, a digital camera, a cell phone equipped with a camera, DVD recorder/player, a PDA and a personal computer which can record and replay the moving pictures.

The invention claimed is:

1. A quantization method for obtaining quantized orthogonal transform coefficients using a quantization unit, by quantizing orthogonal transform coefficients, said method comprising:
obtaining, using the quantization unit, a weighting matrix;
obtaining, using the quantization unit, a quantization parameter;
calculating, using the quantization unit, a level scale values by multiplying a value, which is calculated from a component in i-th row and j-th column in the weighting matrix, and a normalization value, which is corresponding to the position of the component in 1-th row and j-th column in the weighting matrix and a remainder of the quantization parameter divided by an integer equal to or greater than 2;
multiplying, using the quantization unit, an orthogonal transform coefficient and the level scale value; and
shifting, using the quantization unit, a product resulted from the multiplication by the number of bits in accordance with the quantization parameter so as to obtain a quantized orthogonal transform coefficient, wherein a computer is configured to perform the above steps to obtain the quantized orthogonal transform coefficient.

2. The quantization method according to claim 1,
wherein the normalization value is a value determined according to the position of the component in the weighting matrix with regard to a vertical and a horizontal position.

3. The quantization method according to claim 1 wherein the remainder of the quantization parameter is divided by 6.

4. An image coding method, using one of an encoder apparatus, for quantizing and orthogonal transforming a block image to obtain quantized orthogonal transform coefficients, said method comprising:
obtaining, using the encoder apparatus, orthogonal transform coefficients through an addition/subtraction operation and a bit shifting operation by orthogonal transforming a block image;
obtaining, using the quantization unit, a weighting matrix;
obtaining, using the quantization unit, a quantization parameter;
calculating, using the quantization unit, a level scale value by multiplying a value, which is calculated from a component in i-th row and j-th column in the weighting matrix, and a quantization step, which is corresponding to the position of the component in i-th row and j-th column in the weighting matrix and a remainder of the quantization parameter divided by 6;
multiplying, using the quantization unit, an orthogonal transform coefficient and the level scale value; and
shifting, using the quantization unit, a product resulted from the multiplication by the number of bits according to the quantization parameter so as to obtain a quantized orthogonal transform coefficient, wherein a computer is configured to perform the above steps to obtain the quantized orthogonal transform coefficient.

5. An image coding apparatus which codes image data to obtain a coded block image on a block basis, said apparatus comprising:
an orthogonal transformation unit operable to perform orthogonal transform on an image data through an addition/subtraction operation and a bit shifting operation to obtain a orthogonal transformed block image;
an obtainment unit operable to obtain a weighting matrix and a quantization parameter, and calculate a level scale value by multiplying a value, which is calculated from a component in 1-th row and j-th column in the weighting matrix, and a quantization step, which is corresponding to the position of the component in 1-th row and j-th column in the weighting matrix and a remainder of the quantization parameter divided by an integer equal to 6; and
a multiplying unit operable to multiply an orthogonal transform coefficient and the level scale value; and
a shifter which shifts a product resulted from a multiplication by the number of bits according to the quantization parameter.

6. A processor for use in a coding apparatus which codes a moving picture, said processor comprising:
an integrated circuit, wherein the processor,
i) performs an orthogonal transform on an image data,
ii) obtains a weighting matrix and a quantization parameter, using said integrated circuit,
iii) calculates a level scale value by multiplying a value, which is calculated from a component in i-th row and j-th column in the weighting matrix, and a quantization step, which is corresponding to the position of the component in i-th row and j-th column in the weighting matrix and a remainder of the quantization parameter divided by 6;
iv) multiplies an orthogonal transform coefficient and the level scale value, and
v) shifts a product resulted from the multiplication by the number of bits according to the quantization parameter so as to obtain a quantized orthogonal transform coefficient.

7. A non-transitory computer-readable storage medium storing a program for coding an image using a computer, said program causing the computer to execute the following steps:
obtaining, using the computer, a weighting matrix;
obtaining, using the computer, a quantization parameter;
calculating, using the computer, a level scale value by multiplying a value, which is calculated from a component in i-th row and j-th column in the weighting matrix, and a normalization value, which is corresponding to the position of the component in i-th row and j-th column in the weighting matrix and a remainder of the quantization parameter divided by 6;
multiplying, using the computer, a orthogonal transform coefficient and the level scale value; and
shifting, using the computer, a product resulted from the multiplication by the number of bits according to the quantization parameter so as to obtain a quantized orthogonal transform coefficient.

* * * * *